US012228042B1

(12) United States Patent
Miller et al.

(10) Patent No.: US 12,228,042 B1
(45) Date of Patent: Feb. 18, 2025

(54) LUBRICATION SYSTEM FOR A TURBINE ENGINE

(71) Applicant: General Electric Company, Schenectady, NY (US)

(72) Inventors: Brandon W. Miller, Middletown, OH (US); Arthur W. Sibbach, Boxford, MA (US); Andrew Hudecki, Milford, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/537,490

(22) Filed: Dec. 12, 2023

Related U.S. Application Data

(60) Provisional application No. 63/517,751, filed on Aug. 4, 2023.

(51) Int. Cl.
*F01D 25/20* (2006.01)
*F02C 7/06* (2006.01)
(52) U.S. Cl.
CPC ............ *F01D 25/20* (2013.01); *F02C 7/06* (2013.01); *F05D 2220/32* (2013.01); *F05D 2260/98* (2013.01)
(58) Field of Classification Search
CPC .. F01D 25/20; F01D 25/18; F02C 7/06; F02C 7/36; F05D 2220/32; F05D 2260/98; F05D 2260/40311; F16H 57/0457; F16N 2210/02; F01M 9/06
USPC ............................. 184/6.11, 11.1, 11.4, 13.1
See application file for complete search history.

(56) References Cited

U.S. PATENT DOCUMENTS

| | | | |
|---|---|---|---|
| 2,010,896 A * | 8/1935 | Richard | F16N 7/18 384/403 |
| 3,499,503 A | 3/1970 | Murray et al. | |
| 4,732,237 A * | 3/1988 | Nakano | F02B 75/16 123/196 R |
| 4,845,483 A * | 7/1989 | Negishi | G06K 15/12 347/225 |
| 4,987,974 A * | 1/1991 | Crouch | F16N 21/00 464/7 |

(Continued)

FOREIGN PATENT DOCUMENTS

| | | |
|---|---|---|
| EP | 3557009 A1 | 10/2019 |
| FR | 3084427 B1 | 3/2021 |

(Continued)

*Primary Examiner* — Henry Y Liu
(74) *Attorney, Agent, or Firm* — Venable LLP; Peter T. Hrubiec; Michele V. Frank

(57) ABSTRACT

A lubrication system for a turbine engine having a longitudinal centerline axis and one or more rotating components. The lubrication system includes a primary lubrication system that supplies lubricant to the one or more rotating components during normal operation of the turbine engine. The lubrication system also includes an auxiliary lubrication system. The auxiliary lubrication system includes an auxiliary reservoir and a lubricant dispersion device. The auxiliary reservoir stores the lubricant therein. The lubricant dispersion device rotates about the longitudinal centerline axis. The lubricant dispersion device collects the lubricant in the auxiliary reservoir and disperses the lubricant to the one or more rotating components as the lubricant dispersion device rotates.

20 Claims, 8 Drawing Sheets

(56) References Cited

U.S. PATENT DOCUMENTS

| | | | | |
|---|---|---|---|---|
| 5,119,905 | A * | 6/1992 | Murray | F16N 21/00 464/7 |
| 5,647,735 | A | 7/1997 | Rockwood | |
| 5,694,765 | A * | 12/1997 | Hield | F02C 3/113 60/39.163 |
| 5,845,483 | A * | 12/1998 | Petrowicz | F02C 7/262 60/788 |
| 7,124,857 | B2 * | 10/2006 | Gekht | F01D 25/16 184/11.2 |
| 7,662,059 | B2 * | 2/2010 | McCune | F01D 25/20 184/6.12 |
| 7,815,536 | B2 * | 10/2010 | Jansen | H02K 7/116 290/55 |
| 7,841,961 | B2 * | 11/2010 | Shimizu | F16H 1/227 74/438 |
| 7,849,668 | B2 * | 12/2010 | Sheridan | F01D 25/20 384/473 |
| 7,883,438 | B2 | 2/2011 | McCune | |
| 8,007,253 | B2 * | 8/2011 | Dooley | F04D 29/047 415/72 |
| 8,066,472 | B2 * | 11/2011 | Coffin | F16C 33/6677 416/174 |
| 8,307,626 | B2 * | 11/2012 | Sheridan | F01D 25/20 184/29 |
| 8,678,937 | B2 * | 3/2014 | Humes | F16D 1/10 464/7 |
| 8,702,373 | B1 * | 4/2014 | Valva | F16H 57/0495 416/174 |
| 9,086,055 | B2 * | 7/2015 | Subramaniam | F03D 80/70 |
| 9,353,848 | B2 * | 5/2016 | Blewett | F01D 25/18 |
| 9,879,773 | B2 * | 1/2018 | Slayter | F16H 1/06 |
| 9,903,227 | B2 * | 2/2018 | Cigal | F01D 25/18 |
| 10,145,462 | B2 * | 12/2018 | Slayter | F16H 57/0426 |
| 10,167,873 | B2 * | 1/2019 | Sheridan | F02C 7/32 |
| 10,196,926 | B2 * | 2/2019 | Ketchum | F01D 25/20 |
| 10,208,624 | B2 * | 2/2019 | Duong | F02C 3/107 |
| 10,267,233 | B2 * | 4/2019 | Mastro | F02C 3/107 |
| 10,316,855 | B2 * | 6/2019 | Mastro | F04D 29/329 |
| 10,371,007 | B2 * | 8/2019 | Cigal | F01D 25/20 |
| 10,513,949 | B2 * | 12/2019 | Parnin | F16H 57/0442 |
| 10,526,913 | B2 * | 1/2020 | Roberge | F02C 7/36 |
| 10,570,824 | B2 * | 2/2020 | Schwarz | F16H 57/0482 |
| 10,577,974 | B2 | 3/2020 | Valva et al. | |
| 10,634,053 | B2 * | 4/2020 | Schwarz | F16H 57/0471 |
| 10,801,413 | B2 * | 10/2020 | Roberge | F02C 6/14 |
| 10,969,000 | B2 * | 4/2021 | Slayter | F16H 57/043 |
| 11,067,006 | B2 * | 7/2021 | Gebhard | F02C 3/10 |
| 11,092,037 | B2 | 8/2021 | Valva et al. | |
| 11,300,199 | B2 * | 4/2022 | Poster | F16H 57/0457 |
| 11,655,731 | B2 * | 5/2023 | Legare | F16H 57/0452 60/39.08 |
| 2006/0213726 | A1 * | 9/2006 | Gekht | F01D 25/16 184/11.4 |
| 2011/0168494 | A1 * | 7/2011 | Subramaniam | F03D 80/70 184/6.12 |
| 2016/0376949 | A1 | 12/2016 | Parnin | |
| 2017/0089262 | A1 * | 3/2017 | Yokoyama | C09D 5/16 |
| 2018/0058569 | A1 * | 3/2018 | Slayter | F16H 57/0434 |
| 2018/0087656 | A1 * | 3/2018 | Poster | F16H 57/0449 |
| 2018/0259060 | A1 * | 9/2018 | Poster | F16H 57/0457 |
| 2019/0093752 | A1 * | 3/2019 | Slayter | F16H 57/0434 |
| 2019/0376416 | A1 * | 12/2019 | Mastro | F02C 7/36 |
| 2020/0109776 | A1 * | 4/2020 | Mueller | F16H 57/0456 |
| 2020/0240412 | A1 | 7/2020 | Kimura et al. | |
| 2020/0284201 | A1 * | 9/2020 | Gebhard | F02C 3/10 |
| 2021/0254506 | A1 * | 8/2021 | Legare | F16N 7/38 |
| 2022/0349465 | A1 * | 11/2022 | Mueller | F16H 57/0423 |
| 2023/0313739 | A1 * | 10/2023 | Becoulet | F02C 7/32 184/6.11 |

FOREIGN PATENT DOCUMENTS

| | | |
|---|---|---|
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| GB | 2234035 B | 5/1993 |

* cited by examiner

LUBRICATION SYSTEM FOR A TURBINE ENGINE

CROSS-REFERENCE TO RELATED APPLICATIONS

This application claims priority to U.S. Provisional Application No. 63/517,751, filed Aug. 4, 2023, the entire contents of which is hereby incorporated by reference.

TECHNICAL FIELD

The present disclosure relates generally to a lubrication system, for example, for a turbine engine.

BACKGROUND

Turbine engines generally includes a fan and a core section arranged in flow communication with one another. Turbine engines include one or more rotating components that rotate. A lubrication system provides a lubricant to the one or more rotating components.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
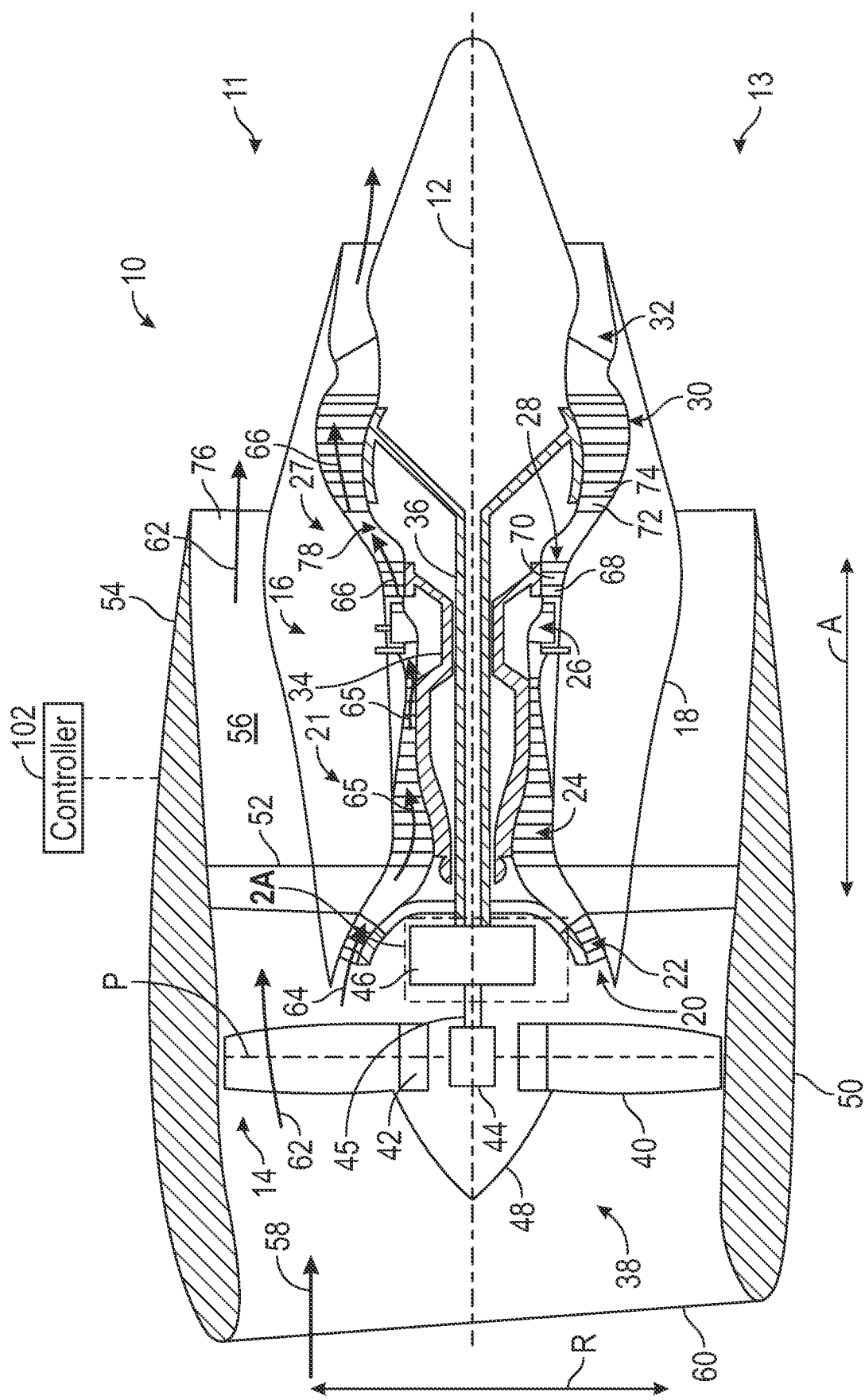
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a high-bypass turbine engine, forward refers to a position closer to an engine inlet and aft refers to a position closer to an engine nozzle or exhaust. In one example, in a reverse flow turbine engine, forward refers to a position closer to the engine nozzle or exhaust and aft refers to a position closer to an engine inlet.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "normal operation" of a turbine engine is intended to mean when the turbine engine is operating, and a primary lubrication system of the turbine engine is supplying lubricant to one or more rotating components of the turbine engine.

As used herein, "windmill" or "windmilling" is a condition when the fan and the low-pressure shaft of the turbine engine continue to rotate at low speeds, while the high-pressure shaft rotates slowly or even stops. Windmilling can occur when the turbine engine is shut down, but air still flows across the fan, such as during an in-flight engine shutdown or when the turbine engine is on the ground and the fan is rotating in the presence of wind when the turbine engine is shutdown. During a shutdown, e.g., while the aircraft is on the ground, the fan may also rotate in either direction depending upon the stationary position of the turbine engine relative to the ambient wind. Airflow entering the fan exhaust may exit the fan inlet in an opposite direction as a direction of operation and cause the fan to rotate in an opposite rotational direction compared to the intended operational rotational direction.

As used herein, to "activate" an auxiliary lubrication system or "activating" an auxiliary lubrication system includes causing lubricant to flow within the auxiliary lubrication system. For example, activating the auxiliary lubrication system includes powering an auxiliary pump to pump the lubricant through the auxiliary lubrication system or closing a drain valve or a scavenge valve to fill a secondary reservoir with the lubricant. In some embodiments, the drain valve or the scavenge valve is opened when the auxiliary lubrication system is active, and another valve closes to fill the secondary reservoir with lubricant.

As used herein, to "inactivate" an auxiliary lubrication system or an "inactive" auxiliary lubrication system includes preventing the lubricant from flowing within the auxiliary lubrication system. For example, when the auxiliary lubrication system is inactive, the auxiliary pump is powered off and is prevented from pumping the lubricant through the auxiliary lubrication or the drain valve is opened to prevent the secondary reservoir from being filled with the lubricant. In some embodiments, the drain valve or the scavenge valve is closed when the auxiliary lubrication system is inactive, and another valve opens to prevent the secondary reservoir from being filled with the lubricant.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a turbine engine having a lubrication system. The turbine engine includes a fan having a fan shaft. The turbine engine includes one or more rotating components that rotate within the turbine engine. The one or more rotating components can include, for example, one or more shafts, one or more gears, or one or more bearings including one or more engine bearings for the one or more shafts of the turbine engine (e.g., a low-pressure shaft or a high-pressure shaft) or one or more gearbox bearings for a gearbox assembly of the turbine engine. The one or more gearbox bearings allow rotation of the one or more gears of the gearbox assembly about the one or more gearbox bearings. In one embodiment, one or more of the bearings are journal bearings. The one or more bearings can include any type of bearings, such as, for example, roller bearings, or the like. The lubrication system supplies lubricant (e.g., oil) to the one or more rotating components. Preferably, the lubrication system supplies the lubricant to the gearbox for lubricating the gears or the gearbox bearings. The lubrication system disclosed herein can be used to supply the lubricant to other rotating components of the turbine engine (e.g., the one or more shafts or the one or more engine bearings). The lubrication system includes one or more tanks that store lubricant therein, and a primary lubrication system having a primary pump and a primary lubricant supply line. During normal operation of the turbine engine, the primary pump pumps the lubricant from the one or more tanks to the one or more rotating components through the primary lubricant supply line.

The bearings, especially journal bearings, are hydrodynamic bearings that typically require a steady supply of lubricant during all operational phases of the turbine engine to properly lubricate the bearings to prevent damage due to sliding contact for hydrodynamic journal bearings or even for the generic gear mesh interface. The shafts of the turbine engine may experience long duration, continued rotation following a shutdown of the turbine engine, such as that occurring during windmilling. In such instances, the one or more rotating components, and, in particular, the one or more bearings, can be affected by not receiving enough lubricant for lubricating the one or more rotating components. For example, during windmilling, the rotational speed of the shafts may be too low to power the primary pump to pump the lubricant to the one or more rotating components. In some instances, e.g., during operation of the turbine engine (e.g., in-flight), the lubrication system may lose pressure (e.g., due to a failure of the primary pump or other components of the primary lubrication system), such that the primary lubrication system is unable to provide the lubricant to the one or more rotating components via the primary pump and the primary lubricant supply line.

The criticality of the lubricant interruptions increases when the bearings are journal bearings, since the absence of lubricant at the journal bearings can lead to a journal bearing failure and subsequent gearbox failure, which may cause the low-speed shaft to lock up permanently. Such a failure of the journal bearings is referred to as a journal bearing seizure and occurs when there is contact between the planet pin and the bore of the gear, thereby causing a significant increase of wear and friction that leads to bearing failure. If contact occurs between the journal bearing and the pin during high-power operation, the two components can become welded together due to the high temperature from the friction.

Some turbine engines include an auxiliary lubrication system that includes an auxiliary pump to supply lubricant to the one or more rotating components to prevent damage to the rotating components due to inadequate lubricant supply during windmilling. Such auxiliary lubrication systems, however, typically operate based on a speed of the fan such that the auxiliary lubrication system operates only when the fan speed is below a threshold speed, such as during a shutdown of the turbine engine. Such auxiliary lubrication systems may be unable to operate to supply the lubricant to the one or more rotating components during operation of the turbine engine, for example, when the turbine engine is operating (e.g., the fan speed is greater than the threshold speed), and the primary lubrication system is unable to provide the lubricant to the one or more rotating components. Further, the auxiliary pump requires added complexity to provide the lubricant during high speeds, such as during operation of the turbine engine, and during low speeds, such as during windmilling (e.g., in-flight or on the ground). Further, the auxiliary pump requires added complexity to provide the lubricant while the fan windmills in either direction (e.g., the fan rotates clockwise or counter-clockwise).

Some auxiliary lubrication systems are always active such that the lubricant flows through the auxiliary lubrication system and a valve directs the lubricant either to the primary lubrication system or to the gearbox assembly. Such a configuration of the auxiliary lubrication system being always active, however, requires running the auxiliary pump during operation of the turbine engine, thereby reducing a lifespan of the auxiliary pump. Such auxiliary lubrication systems may also overflow the rotating components by supplying too much lubricant to the rotating components, thereby introducing inefficiencies of the rotating components due to excessive churning or windage losses.

Accordingly, the present disclosure provides an auxiliary lubrication system that supplies the lubricant to the one or more rotating components (e.g., the gears or the gearbox bearings) during any time that the primary lubrication system is unable to supply the lubricant. The auxiliary lubrication system includes an auxiliary reservoir that stores the lubricant therein and a lubricant dispersion device. The lubricant dispersion device, also referred to as a scupper or a splasher, is a mechanical device that is drivingly coupled to at least one of the fan shaft, the LP shaft, or the gears of the gearbox assembly. The lubricant dispersion device collects the lubricant in the auxiliary reservoir and disperses (e.g., splashes) the lubricant onto the one or more rotating components during windmilling of the fan or during other conditions in which the primary lubrication system is unable to supply the lubricant to the one or more rotating components. The lubricant dispersion device operates regardless of the rotational direction of the fan (e.g., clockwise or counterclockwise). In some embodiments, the lubricant dispersion device includes a gear assembly such that the lubricant dispersion device is coupled to the at least one of the fan shaft, the LP shaft, or the gears through the gear assembly. The gear assembly increases a rotational speed of the lubricant dispersion device from a rotational speed of the at least one of the fan shaft, the LP shaft, or the gears. In some embodiments, the gear assembly has a gear ratio of greater than or equal to 10:1 such that the rotational speed of the lubricant dispersion device is greater than or equal to ten times the rotational speed of the at least one of the fan shaft, the LP shaft, or the gears. In this way, the lubricant dispersion device disperses the lubricant from the auxiliary reservoir to the one or more rotating components even if the rotational speed of the at least one of the fan shaft, the LP shaft, or the gears is low. The lubricant dispersion device can operate regardless of the rotational direction of the fan (e.g., clockwise or counterclockwise). For example, the lubricant dispersion device collects the lubricant in the auxiliary reservoir and disperses the lubricant to the one or more rotating components if the fan is rotating in a first rotational direction and if the fan is rotating in a second rotational direction.

The auxiliary lubrication system may include a clutch that engages or disengages the lubricant dispersion device. The clutch engages or disengages the lubricant dispersion device based on a pressure of the lubricant in the primary lubricant system. For example, the clutch disengages the lubricant dispersion device such that the lubricant dispersion device does not rotate when the pressure of the lubricant in the primary lubrication system is greater than a primary pressure threshold. The clutch engages the lubricant dispersion device such that the lubricant dispersion device rotates when the pressure of the lubricant in the primary lubrication system is less than the primary pressure threshold. Accordingly, the auxiliary lubrication system supplies the lubricant to the one or more rotating components (e.g., the gears or the gearbox bearings) while the turbine engine is operating and if the primary lubrication system fails, and can no longer supply the lubricant to the one or more rotating components.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In the orientation of FIG. 1, portions of the turbine engine 10 above the longitudinal centerline axis 12 are referred to as a top portion 11 and portions of the turbine engine 10 below the longitudinal centerline axis 12 are referred to as a bottom portion 13. The turbine engine 10 may be viewed with respect to a "clock" orientation having a twelve o'clock position, a three o'clock position, a six o'clock position, and a nine o'clock position, when viewed from a forward view of the turbine engine 10 (e.g., annular about the longitudinal centerline axis 12). Although not provided with reference numerals, the clock orientation is understood to include all clock positions therebetween. The twelve o'clock position is positioned at a top of the turbine engine 10 (e.g., at the top portion 11), the three o'clock position is positioned ninety degrees (90°) from the twelve o'clock position (out of the page in the view of FIG. 1), the six o'clock position is positioned at a bottom of the turbine engine 10 (e.g., at the bottom portion 13) and is one hundred eighty degrees (180°) from the twelve o'clock position, and the nine o'clock position is positioned ninety degrees (90°) from the six o'clock position (e.g., into the page in the view of FIG. 1).

In general, the turbine engine 10 includes a fan section 14 and a turbo-engine 16 disposed downstream from the fan section 14. The turbo-engine 16 includes, in serial flow relationship, a compressor section 21, a combustion section 26, and a turbine section 27. The turbo-engine 16 is substantially enclosed within an outer casing 18 that is substantially tubular and defines an annular inlet 20. As schematically shown in FIG. 1, the compressor section 21 includes a booster or a low pressure (LP) compressor 22 followed downstream by a high pressure (HP) compressor 24. The combustion section 26 is downstream of the compressor section 21. The turbine section 27 is downstream of the combustion section 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34 or a spool, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a fan hub 48 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air, also referred to as bypass air 62 is routed into the bypass airflow passage 56, and a second portion of air, also referred to as core air 64, is routed into the upstream section of the core air flow path through the annular inlet 20 of the LP compressor 22. The ratio between the bypass air 62 and the core air 64 is commonly known as a bypass ratio. The pressure of the core air 64 is then increased, generating compressed air 65. The compressed air 65 is routed through the HP compressor 24 and into the combustion section 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 102 is in communication with the turbine engine 10 for controlling aspects of the turbine engine 10. For example, the controller 102 is in two-way communication with the turbine engine 10 for receiving signals from various sensors and control systems of the turbine engine 10 and for controlling components of the turbine engine 10, as detailed further below. The controller 102, or components thereof, may be located onboard the turbine engine 10, onboard the aircraft, or can be located remote from each of the turbine engine 10 and the aircraft. The controller 102 can be a Full Authority Digital Engine Control (FADEC) that controls aspects of the turbine engine 10.

The controller 102 may be a standalone controller or may be part of an engine controller to operate various systems of the turbine engine 10. In this embodiment, the controller 102 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 102 to perform operations. The controller 102 and, more specifically, the one or more processors are programmed or configured to perform these operations, such as the operations discussed further below. In some embodiments, the instructions can be executed by the one or more processors to cause the one or more processors to complete any of the operations and functions for which the controller 102 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. The turbine engine 10 may also be a direct drive engine, which does not have a power gearbox. The fan speed is the same as the LP shaft speed for a direct drive engine. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2A:
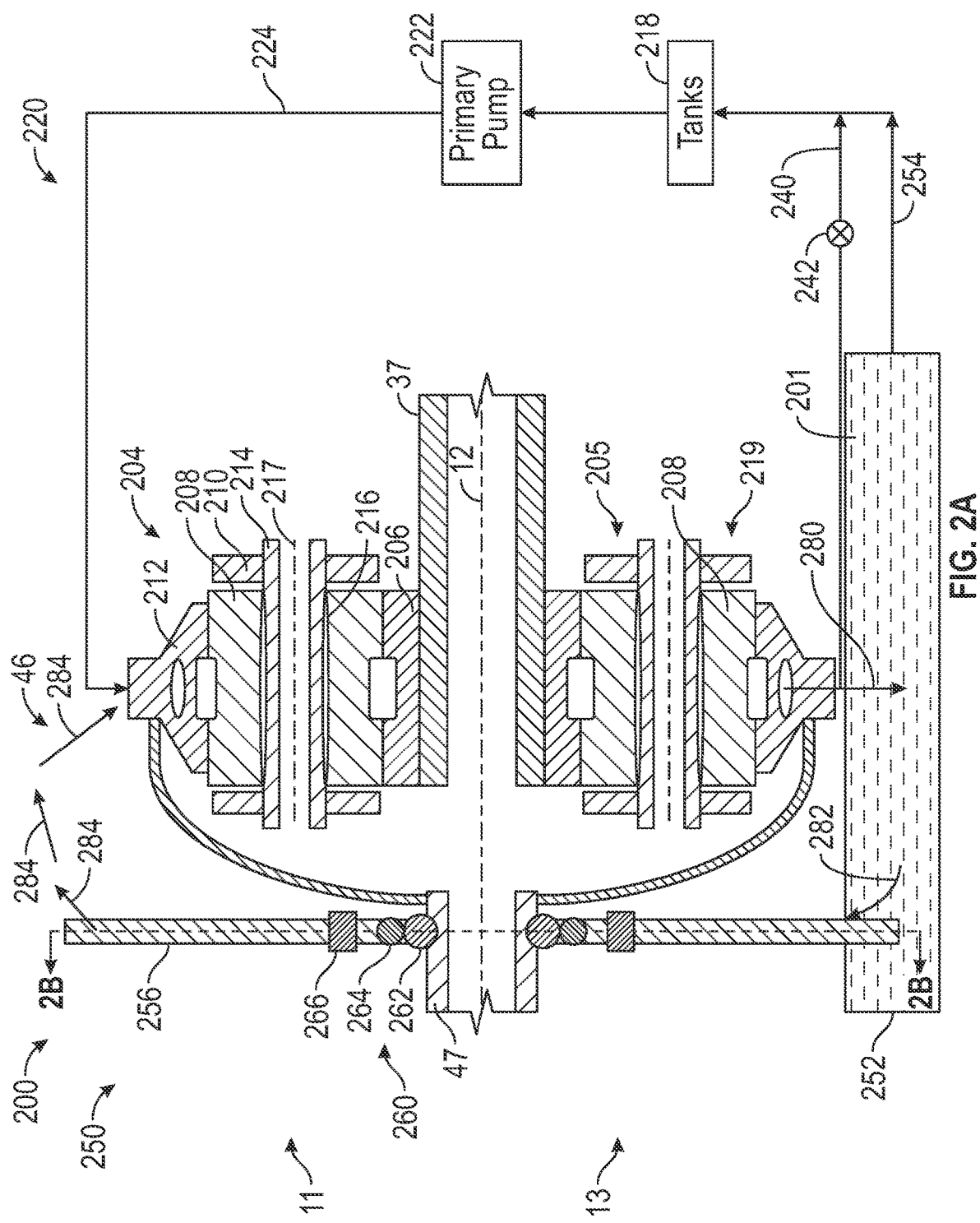
FIG. 2A is a schematic axial end cross-sectional view of a lubrication system for a gearbox assembly for the turbine engine of FIG. 1, taken along a latitudinal centerline axis of the gearbox assembly, according to the present disclosure.

FIG. 2A is a schematic axial end cross-sectional view of a lubrication system 200 for the gearbox assembly 46 (FIG. 1), according to the present disclosure. The gearbox assembly 46 includes a gear assembly 204 including a plurality of gears 205 including a first gear 206, one or more second gears 208 secured by a planet carrier 210, and a third gear 212. In FIG. 2A, the first gear 206 is a sun gear, the one or more second gears 208 are planet gears, and the third gear 212 is a ring gear. The gear assembly 204 can be an epicyclic gear assembly. When the gear assembly 204 is an epicyclic gear assembly, the one or more second gears 208 include a plurality of second gears 208 (e.g., two or more second gears 208). FIG. 2A shows two second gears 208 (e.g., one second gear 208 in the top portion 11 and one second gear 208 in the bottom portion 13), but the one or more second gears 208 can include any number of second gears 208.

In the epicyclic gear assembly, the gear assembly 204 can be in a star arrangement or a rotating ring gear type gear assembly (e.g., the third gear 212 is rotating and the planet carrier 210 is fixed and stationary). In such an arrangement, the fan 38 (FIG. 1) is driven by the third gear 212. For example, the third gear 212 is coupled to the fan shaft 45 (FIG. 1) such that rotation of the third gear 212 causes the fan shaft 45, and, thus, the fan 38, to rotate. In this way, the third gear 212 is an output of the gear assembly 204. However, other suitable types of gear assemblies may be employed. In one non-limiting embodiment, the gear assembly 204 is a planetary arrangement, in which the third gear 212 is held fixed, with the planet carrier 210 allowed to rotate. In such an arrangement, the fan 38 is driven by the planet carrier 210. For example, the planet carrier 210 is coupled to the fan shaft 45 such that rotation of the planet carrier 210 causes the fan shaft 45, and, thus, the fan 38, to rotate. In this way, the one or more second gears 208 (e.g., the planet carrier 210) are the output of the gear assembly 204. In another non-limiting embodiment, the gear assembly 204 may be a differential gear assembly in which the third gear 212 and the planet carrier 210 are both allowed to rotate. While an epicyclic gear assembly is detailed herein, the gear assembly can include any type of gear assembly including, for example, a compound gear assembly, a multiple stage gear assembly, a gear assembly for driving a propeller, a gear assembly for driving accessories of the turbine engine 10 (FIG. 1) or accessories of the aircraft, or the like.

Each of the one or more second gears 208 includes a pin 214 disposed therein for coupling each of the one or more second gears 208 to the planet carrier 210. The one or more second gears 208 each includes one or more gearbox bearings 216 disposed therein. The one or more gearbox bearings 216 enable each of the one or more second gears 208 to rotate about the pin 214 such that that each of the one or more second gears 208 rotate about a second gear longitudinal centerline axis 217. The one or more gearbox bearings 216 can include any type of bearing for a gear, such as, for example, journal bearings, roller bearings, or the like. The plurality of gears 205 of the gearbox assembly 46 and the one or more gearbox bearings 216 are one or more rotating components 219 of the turbine engine 10 (FIG. 1).

The first gear 206 is coupled to an input shaft 37 of the turbine engine 10 (FIG. 1). For example, the input shaft 37 is the LP shaft 36 (FIG. 1) and the first gear 206 is coupled to the LP shaft 36 of the turbine engine 10 such that rotation of the LP shaft 36 causes the first gear 206 to rotate. Radially outward of the first gear 206, and intermeshing therewith, is the one or more second gears 208 that are coupled together and supported by the planet carrier 210 (shown schematically). The planet carrier 210 supports and constrains the one or more second gears 208 such that the each of the one or more second gears 208 is enabled to rotate about the corresponding second gear longitudinal centerline axis 217 of each of the one or more second gears 208 without rotating about the periphery of the first gear 206. Radially outwardly of the one or more second gears 208, and intermeshing therewith, is the third gear 212, which is an annular ring gear. The third gear 212 is coupled via an output shaft 47 to the fan 38 (FIG. 1) and rotates to drive rotation of the fan 38 (FIG. 1) about the longitudinal centerline axis 12. For example, the output shaft 47 is the fan shaft 45 (FIG. 1) and rotation of the third gear 212 causes the fan shaft 45, and, thus, the fan 38 to rotate.

The lubrication system 200 includes one or more tanks 218 that store lubricant 201 therein, a primary lubrication system 220, and an auxiliary lubrication system 250. Preferably, the lubricant 201 is oil. The lubricant 201 can be any type of lubricant for lubricating the one or more rotating components 219, such as, for example, the plurality of gears 205 (e.g., the first gear 206, the one or more second gears 208, or the third gear 212) or the one or more gearbox bearings 216 of the gear assembly 204.

The primary lubrication system 220 includes a primary pump 222 and a primary lubricant supply line 224. The primary pump 222 is in fluid communication with the one or more tanks 218 and the primary lubricant supply line 224. The primary lubricant supply line 224 is in fluid communication with the one or more rotating components 219 (e.g., with the plurality of gears 205 and the one or more gearbox bearings 216). The primary pump 222 pumps the lubricant 201 from the one or more tanks 218 to the one or more rotating components 219 through the primary lubricant supply line 224 for supplying the lubricant 201 to the one or more rotating components 219 (e.g., to the plurality of gears 205 or to one or more gearbox bearings 216), as detailed further below. In some embodiments, the lubrication system 200 supplies the lubricant 201 from the one or more tanks 218 to the one or more rotating components 219 without a pump, for example, by gravity or by centrifugal force due to rotation of the planet carrier 210 in the planetary arrangement of the gear assembly 204.

The lubrication system 200 includes a primary lubricant return line 240 for returning the lubricant that drains from the one or more rotating components 219 to the one or more tanks 218. The primary lubricant return line 240, also referred to as a sump line or a scavenge line, is in fluid communication with the one or more rotating components 219 and with the one or more tanks 218. In this way, the lubricant 201 drains from the one or more rotating components 219 and the primary lubricant return line 240 operably directs the lubricant 201 to the one or more tanks 218. In some embodiments, the lubrication system 200 includes a sump pump in fluid communication with the one or more rotating components 219 and the primary lubricant return line 240. The sump pump pumps the lubricant 201 and pumps air within the primary lubricant return line 240 that has leaked into the primary lubricant return line 240 during operation of the turbine engine 10 (FIG. 1). The sump pump is a suction pump that generates suction to pull the lubricant 201 or the air through the primary lubricant return line 240 and towards the one or more tanks 218.

The primary lubricant return line 240 includes one or more drain valves 242 within the primary lubricant return line 240. In this way, the one or more drain valves 242 are in fluid communication with the primary lubrication system 220. The one or more drain valves 242 are in communication with the controller 102 (FIG. 1). The controller 102 controls the one or more drain valves 242 to open and to close the one or more drain valves 242. When the one or more drain valves 242 are open, the lubricant 201 drains from the one or more rotating components 219 through the primary lubricant return line 240 and into the one or more tanks 218, as detailed further below. When the one or more drain valves 242 are closed, the one or more drain valves 242 prevent the lubricant 201 from draining from the one or more rotating components 219, as detailed further below. The one or more drain valves 242 can include any type of valve that opens to allow the lubricant 201 to flow through the primary lubricant return line 240 and that closes to prevent the lubricant 201 from flowing through the primary lubricant return line 240. In some embodiments, the one or more drain valves 242 are in fluid communication with the primary lubrication system 220 and are controlled to be opened or to be closed based on a pressure signal of the lubricant 201 in the primary lubrication system 220 (e.g., in the primary lubricant supply line 224).

The auxiliary lubrication system 250 includes an auxiliary reservoir 252, an auxiliary lubricant return line 254, and a lubricant dispersion device 256. The auxiliary reservoir 252 stores the lubricant 201 therein, as detailed further below. The auxiliary reservoir 252 can be utilized as a sump in the gearbox assembly 46 or can be located outside of the gearbox assembly 46. In some embodiments, the auxiliary reservoir 252 can be utilized as the one or more tanks 218. The auxiliary reservoir 252 is in fluid communication with the one or more rotating components 219 such that the lubricant 201 can drain from the one or more rotating components 219 to the auxiliary reservoir 252. In some embodiments, the primary lubricant return line 240 can be in fluid communication with the auxiliary reservoir 252 such that the lubricant 201 in the auxiliary reservoir 252 flows to the primary lubrication system 220 from the auxiliary reservoir 252 through the primary lubricant return line 240. The auxiliary lubricant return line 254 is in fluid communication with the auxiliary reservoir 252 and the primary lubrication system 220 such that the lubricant 201 can flow from the auxiliary reservoir 252 to the primary lubrication system 220 (e.g., to the primary lubricant supply line 224). In some embodiments, the auxiliary lubricant return line 254 can be in fluid communication with the one or more rotating components 219 such that the lubricant 201 flows from the auxiliary reservoir 252 to the one or more rotating components 219 without flowing through the primary lubrication system 220. In such embodiments, the auxiliary lubrication system 250 includes an auxiliary pump that pumps the lubricant 201 from the auxiliary reservoir 252 to the one or more rotating components 219.

The lubricant dispersion device 256 is a mechanical device that collects a portion of the lubricant 201 from the auxiliary reservoir 252 and disperses the portion of the lubricant 201 to the one or more rotating components 219, as detailed further below. The lubricant dispersion device 256 is a scupper or a flinger that collects the portion of the lubricant 201 from the auxiliary reservoir 252 and flings, or otherwise splashes, the portion of the lubricant 201 to the one or more rotating components 219. In this way, the auxiliary lubrication system 250 is referred to as a splash lubrication system.

The lubricant dispersion device 256 is drivingly coupled to the output shaft 47 (e.g., the fan shaft 45 of FIG. 1) such that rotation of the output shaft 47 causes the lubricant dispersion device 256 to rotate. For example, the lubricant dispersion device 256 is drivingly coupled to the output shaft 47 by a lubricant dispersion device gear assembly 260. The lubricant dispersion device gear assembly 260 includes a first lubricant dispersion device gear 262 and a second lubricant dispersion device gear 264. The first lubricant dispersion device gear 262 is coupled to the output shaft 47 and the second lubricant dispersion device gear 264 is coupled to the lubricant dispersion device 256. The second lubricant dispersion device gear 264 intermeshes with the first lubricant dispersion device gear 262 such that rotation of the first lubricant dispersion device gear 262 causes the second lubricant dispersion device gear 264 to rotate. The lubricant dispersion device gear assembly 260 can include any number of gears for changing a rotational speed of the lubricant dispersion device 256 with respect to a rotational speed of the output shaft 47, as desired. In one non-limiting embodiment, the lubricant dispersion device gear assembly 260 includes a gear ratio of greater than 10:1 such that the rotational speed of the lubricant dispersion device 256 is greater than ten times the rotational speed of the output shaft 47.

The lubricant dispersion device 256 also includes a clutch 266 that engages the lubricant dispersion device 256 to cause the lubricant dispersion device 256 to rotate or disengages the lubricant dispersion device 256 to prevent the lubricant dispersion device 256 from rotating, as detailed further below. The clutch 266 can include a centrifugal clutch that engages or disengages the lubricant dispersion device 256 based on the rotational speed of the output shaft 47. For example, the clutch 266 engages the lubricant dispersion device 256 when the rotational speed of the output shaft 47 is less than a rotational speed threshold. The clutch 266 disengages the lubricant dispersion device 256 when the rotational speed of the output shaft 47 is greater than the rotational speed threshold.

In some embodiments, the clutch 266 engages or disengages the lubricant dispersion device 256 based on a pressure of the lubricant in the primary lubrication system 220. For example, clutch 266 engages the lubricant dispersion device 256 when the pressure of the lubricant 201 in the primary lubrication system 220 is less than a primary pressure threshold. The clutch 266 disengages the lubricant dispersion device 256 when the pressure of the lubricant 201 in the primary lubrication system 220 is greater than the primary pressure threshold. In some embodiments, the lubrication system 200 can include a primary pressure signal line that provides fluid communication from the primary lubrication system 220 (e.g., the primary lubricant supply line 224) to the clutch 266 such that the clutch 266 engages or disengages the lubricant dispersion device 256 based on the pressure of the lubricant 201 in the primary lubrication system 220. In some embodiments, the lubrication system 200 includes one or more pressure sensors that sense the pressure of the lubricant 201 in the primary lubrication system 220. The one or more pressure sensors are in communication with the controller 102 (FIG. 1) such that the controller 102 receives the sensed pressure of the lubricant 201 in the primary lubrication system 220 from the one or more sensors and controls the clutch 266 to engage or to disengage the lubricant dispersion device 256 based on the pressure of the lubricant 201 in the primary lubrication system 220.

Figure 2B:
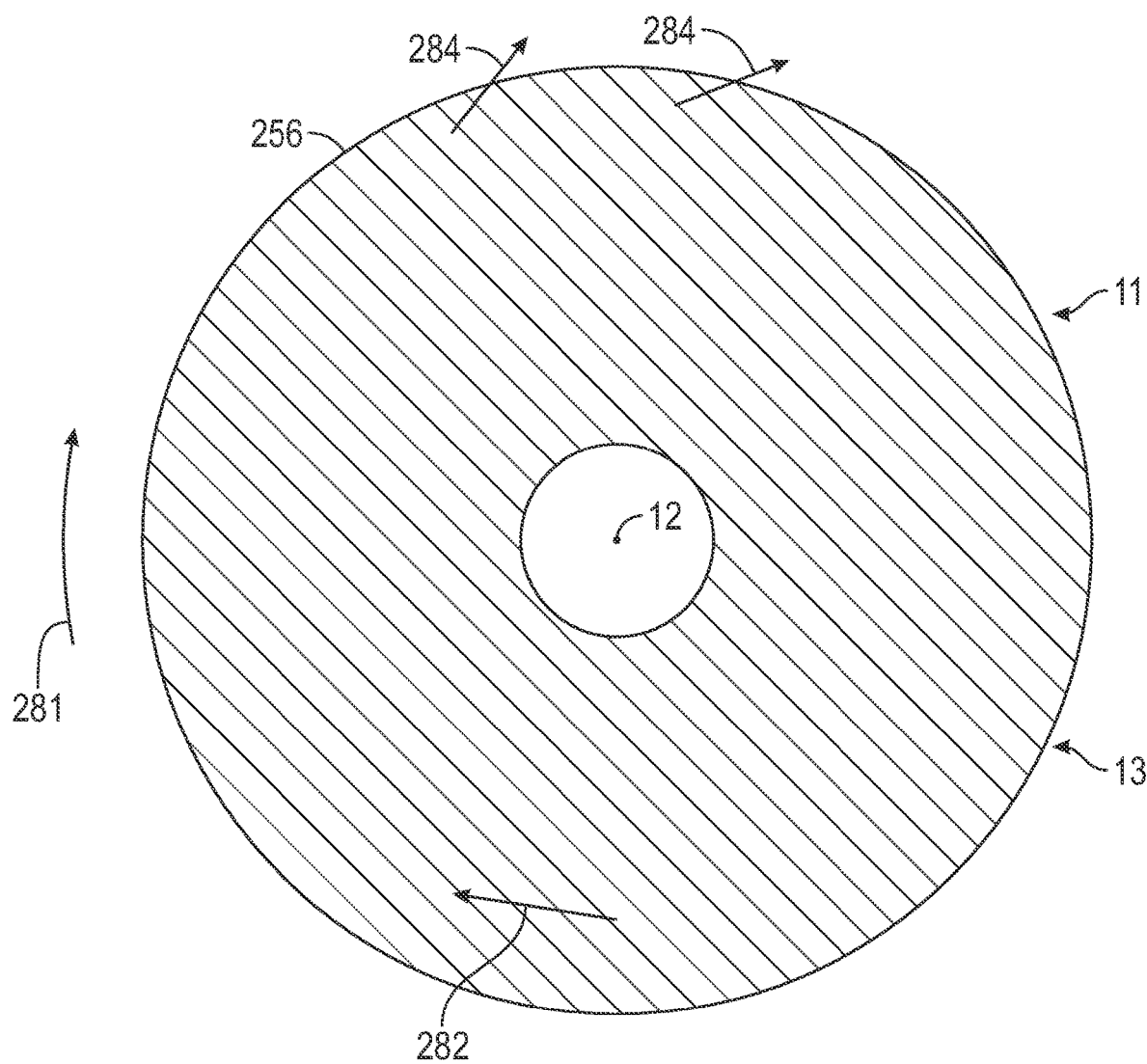
FIG. 2B is a schematic cross-sectional aft view of a lubricant dispersion device of the lubrication system of FIG. 2A, taken along plane 2B-2B in FIG. 2A, and isolated from the lubrication system, according to the present disclosure.

FIG. 2B is a schematic cross-sectional aft view of the lubricant dispersion device 256, taken at plane 2B-2B in FIG. 2A, according to the present disclosure. FIG. 2B shows the lubricant dispersion device 256 isolated from the lubrication system 200, and the lubricant dispersion device gear assembly 260 and the clutch 266 are not shown in FIG. 2B for clarity. As shown in FIG. 2B, the lubricant dispersion device 256 is an annular disk that has a generally circular shape. The lubricant dispersion device 256 is annular about the longitudinal centerline axis 12. The lubricant dispersion device 256, however, can have any shape as desired, as long as the lubricant dispersion device 256 contacts the lubricant 201 in the auxiliary reservoir 252 and disperses the lubricant 201 to the one or more rotating components 219.

With reference back to FIG. 2A, in operation, the input shaft 37 (the LP shaft 36 of FIG. 1) rotates and causes the first gear 206 to rotate. The first gear 206, being intermeshed with the one or more second gears 208, causes each of the one or more second gears 208 to rotate about the second gear longitudinal centerline axis 217. The one or more second gears 208 rotate with respect to the one or more gearbox bearings 216 within the planet carrier 210. When the gear assembly 204 is the star arrangement, the one or more second gears 208, being intermeshed with the third gear 212, cause the third gear 212 to rotate about the longitudinal centerline axis 12. In such embodiments, the planet carrier 210 remains stationary such that the one or more second gears 208 do not rotate about the longitudinal centerline axis 12. When the gear assembly 204 is the planetary arrangement, the third gear 212 is stationary in the planet carrier 210, and the one or more second gears 208, rotate about the longitudinal centerline axis 12. When the gear assembly 204 is the differential gear assembly, both the planet carrier 210 (e.g., the one or more second gears 208) and the third gear 212 rotate about the longitudinal centerline axis 12.

As the plurality of gears 205 of the gear assembly 204 rotate, the primary lubrication system 220 supplies the lubricant 201 to the one or more rotating components 219 (e.g., to the plurality of gears 205 or to the one or more gearbox bearings 216) to lubricate the one or more rotating components 219. During operation of the turbine engine 10 (FIG. 1), the primary pump 222 pumps the lubricant 201 from the one or more tanks 218 and to the one or more rotating components 219 through the primary lubricant supply line 224. The primary lubrication system 220 supplies the lubricant 201 to the plurality of gears 205 and to the one or more gearbox bearings 216.

The lubricant 201 drains from the gear assembly 204 through the primary lubricant return line 240 and to the one or more tanks 218. For example, the one or more drain valves 242 are opened during operation of the turbine engine 10, and the primary pump 222 (or the sump pump or a scavenge pump) pumps the lubricant 201 through the primary lubricant return line 240 and re-circulates the lubricant 201 through the primary lubrication system 220 (e.g., through the primary lubricant supply line 224) and to the one or more rotating components 219. In this way, the lubricant 201 can be re-used to lubricate the one or more rotating components 219. In some embodiments, the primary lubrication system 220 can also supply the lubricant 201 to other components of the gearbox assembly 46, or to other components of the turbine engine 10 (FIG. 1) (e.g., other rotating components of the turbine engine 10). When the primary lubrication system 220 is supplying the lubricant 201 to the one or more rotating components, 219, the clutch 266 is disengaged such that the lubricant dispersion device 256 is prevented from rotating and from dispersing the lubricant 201 to the one or more rotating components 219.

In some instances, the primary lubrication system 220 may be unable to provide the lubricant 201 to the one or more rotating components 219. For example, the primary lubrication system 220 may be unable to pressurize the lubricant 201 to supply the lubricant 201 to the one or more rotating components 219 during windmilling while the turbine engine 10 is shut down, or during a failure of the turbine engine 10, or the primary lubrication system 220 (e.g., the primary pump 222) fails while in-flight. In such instances, the windmilling may cause the shafts of the turbine engine 10 to rotate, thereby causing the gear assembly 204 to rotate. The plurality of gears 205 of the gear assembly 204 or the one or more gearbox bearings 216 can become damaged if there is not enough lubricant 201 supplied to the plurality of gears 205 or to the one or more gearbox bearings 216.

Accordingly, during such instances, the auxiliary lubrication system 250 activates to supply the lubricant 201 to the one or more rotating components 219. For example, the one or more the drain valves 242 close such that the lubricant 201 drains from the one or more rotating components 219 (as indicated by arrow 280) and fills the auxiliary reservoir 252. The lubricant 201 can drain from the auxiliary reservoir 252 through the auxiliary lubricant return line 254 such that the auxiliary reservoir 252 does not overfill with the lubricant 201. In some embodiments, the auxiliary reservoir 252 fills with the lubricant 201 during operation of the primary lubrication system 220 (e.g., while the primary lubrication system 220 is supplying the lubricant 201 to the one or more rotating components 219).

The auxiliary reservoir 252 fills with the lubricant 201 such that the lubricant 201 in the auxiliary reservoir 252 contacts a portion (e.g., the bottom portion 13) of the lubricant dispersion device 256. For example, a portion of the lubricant dispersion device 256 extends into the auxiliary reservoir 252 such that the portion of the lubricant dispersion device 256 contacts the lubricant 201 in the auxiliary reservoir 252. When the primary lubrication system 220 is inoperative (e.g., during windmilling, during a shutdown of the turbine engine 10, etc.), the clutch 266 engages the lubricant dispersion device 256 such that the rotation of the output shaft 47 causes the lubricant dispersion device 256 to rotate (as indicated by arrow 281 in FIG. 2B), as detailed above. As the lubricant dispersion device 256 rotates, the lubricant dispersion device 256 collects a portion of the lubricant 201 in the auxiliary reservoir 252 (as indicated by arrow 282). The rotation of the lubricant dispersion device 256 causes the portion of the lubricant 201 to move from the bottom portion 13 to the top portion 11 of the lubricant dispersion device 256. The rotation of the lubricant dispersion device 256 then causes the portion of the lubricant 201 to separate from the lubricant dispersion device 256 such that the lubricant dispersion device 256 disperses the portion of the lubricant 201 to the one or more rotating components 219 (e.g., to the top portion 11 of the gear assembly 204) (as indicated by arrows 284).

In this way, the lubricant dispersion device 256 collects the portion of the lubricant 201 in the auxiliary reservoir 252 as the lubricant dispersion device 256 rotates through the auxiliary reservoir 252. Thus, the auxiliary lubrication system 250 supplies the lubricant 201 to the one or more rotating components 219 (e.g., the plurality of gears 205 of the gear assembly 204 and to the one or more gearbox bearings 216) even if the primary lubrication system 220 loses pressure and the primary lubrication system 220 is unable to supply the lubricant 201 through the primary lubricant supply line 224. The lubricant dispersion device 256 operates regardless of a rotational direction of the fan 38. For example, the fan 38 can rotate in a first rotational direction (e.g., clockwise) or in a second rotational direction (e.g., counterclockwise) while the fan 38 is windmilling. The lubricant dispersion device 256 collects the lubricant 201 in the auxiliary reservoir 252 and disperses the lubricant 201 to the one or more rotating components 219 if the fan 38 (FIG. 1) is rotating in the first rotational direction and in the second rotational direction.

In some embodiments, the clutch 266 is controlled by at least one of a pressure of the lubricant 201, a pressure of fuel in the turbine engine 10 (FIG. 1), or a pressure of hydraulics of the turbine engine 10 (e.g., hydraulics for controlling control surfaces of the aircraft). For example, the clutch 266 disengages the lubricant dispersion device 256 when the at least one of the pressure of the lubricant 201, the pressure of the fuel in the turbine engine 10, or the pressure of the hydraulics of the turbine engine 10 is greater than a primary pressure threshold. The primary pressure threshold is determined based on a predetermined operating speed of the turbine engine 10 (e.g., a speed of the turbo-engine 16 (FIG. 1) or a speed of the fan 38). The clutch 266 engages the lubricant dispersion device 556 when the at least one of the pressure of the lubricant 201, the pressure of the fuel in the turbine engine 10, or the pressure of the hydraulics of the turbine engine 10 is less than the primary pressure threshold.

In some embodiments, the at least one of the pressure of the lubricant 201, the pressure of the fuel in the turbine engine 10, or the pressure of the hydraulics of the turbine engine 10 is based on a speed of the turbo-engine 16. For example, when a speed of the turbo-engine 16 (e.g., the HP shaft 34 or the LP shaft 36 of FIG. 1) is greater than a speed threshold, the at least one of the pressure of the lubricant 201, the pressure of the fuel in the turbine engine 10, or the pressure of the hydraulics of the turbine engine 10 is greater than the primary pressure threshold. Similarly, when the speed of the turbo-engine 16 is less than the speed threshold, the at least one of the pressure of the lubricant 201, the pressure of the fuel in the turbine engine 10, or the pressure of the hydraulics of the turbine engine 10 is less than the primary pressure threshold. In some embodiments, the speed threshold of the turbo-engine 16 is at least 5% of a maximum speed of the turbo-engine 16. In some embodiments, the speed threshold of the turbo-engine 16 is approximately 5% to approximately 10% of the maximum speed of the turbo-engine 16. The speed threshold can include any value up to the maximum speed of the turbo-engine 16 for determining when to disengage the clutch 266.

In some embodiments, the clutch 266 is controlled by the controller 102 (FIG. 1). For example, the controller 102 controls the clutch 266 to engage or to disengage the lubricant dispersion device 256. In such embodiments, the clutch 266 is an electrically energized clutch. In some embodiments, the clutch 266 disengages the lubricant dispersion device 256 when the controller 102 turns on, and the clutch engages the lubricant dispersion device 256 when the controller 102 turns off (e.g., during a shutdown of the turbine engine 10). The controller 102 turns on when the speed of the turbo-engine 16 greater than the speed threshold. The turbine engine 10 provides power to the controller 102 to turn the controller 102 on when the speed of the turbo-engine 16 is greater than the speed threshold. The controller 102 turns off when the speed of the turbo-engine 16 is less than the speed threshold.

Figure 3:
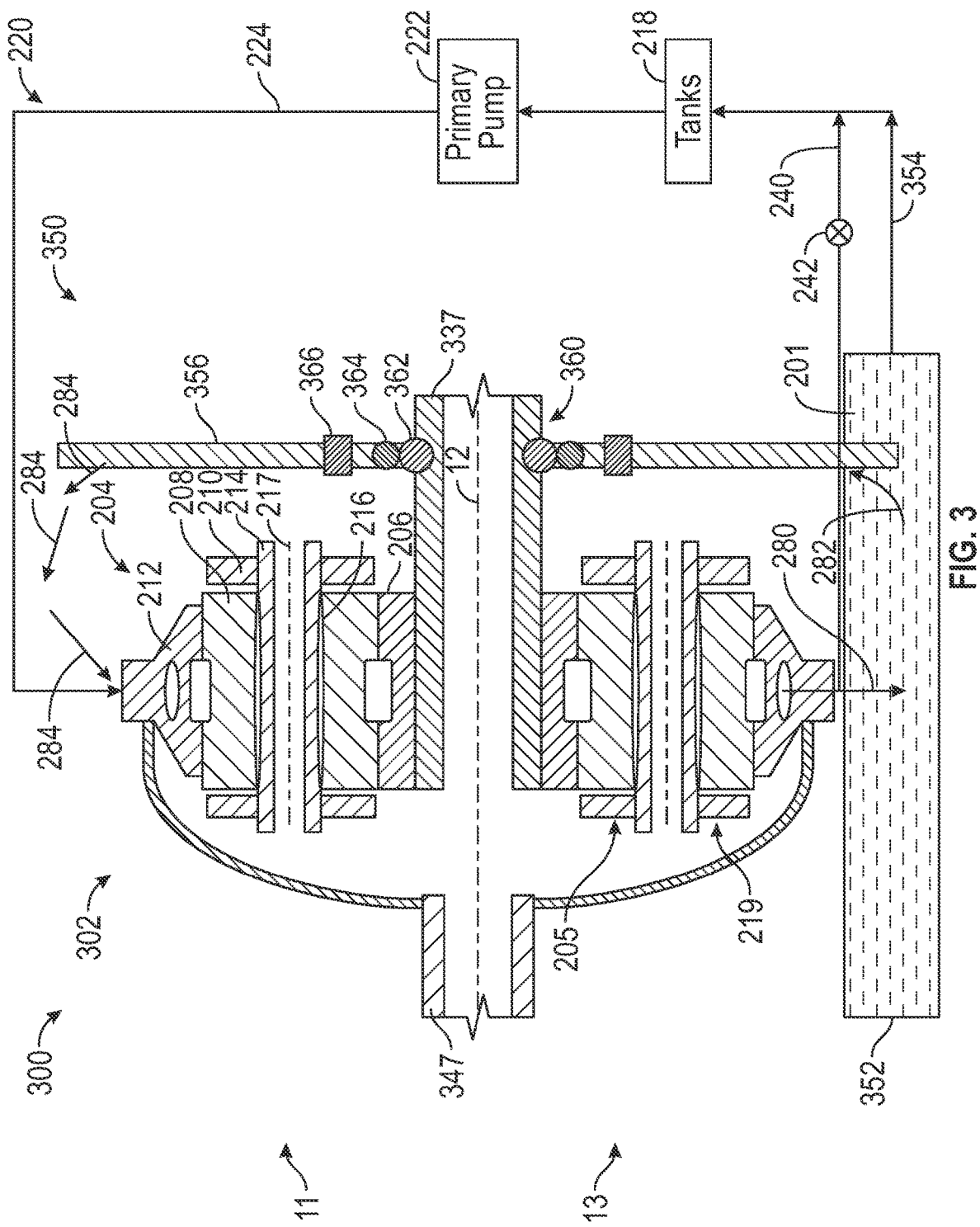
FIG. 3 is a schematic axial end cross-sectional view of a lubrication system for a gearbox assembly, taken along a latitudinal centerline axis of the gearbox assembly, according to another embodiment.

FIG. 3 is a schematic axial end cross-sectional view of a lubrication system 300 for a gearbox assembly 302 for a turbine engine, taken at a longitudinal centerline axis of the gearbox assembly 302, according to the present disclosure. The lubrication system 300 and the gearbox assembly 302 are substantially similar to the lubrication system 200 and the gearbox assembly 46 of FIG. 2A, respectively. The gearbox assembly 302 includes an input shaft 337 and an output shaft 347. The lubrication system 300 includes the primary lubrication system 220 and an auxiliary lubrication system 350. The auxiliary lubrication system 350 includes an auxiliary reservoir 352, an auxiliary lubricant return line 354, and a lubricant dispersion device 356.

The lubricant dispersion device 356 is substantially similar to the lubricant dispersion device 256 of FIGS. 2A and 2B, but the lubricant dispersion device 356 is drivingly coupled to the input shaft 337. For example, the lubricant dispersion device 356 includes a lubricant dispersion device gear assembly 360 including a first lubricant dispersion device gear 362 and a second lubricant dispersion device gear 364. The first lubricant dispersion device gear 362 is coupled to the input shaft 337 and the second lubricant dispersion device gear 364 is coupled to the lubricant dispersion device 356, and intermeshes with the first lubricant dispersion device gear 362. In one non-limiting embodiment, the lubricant dispersion device gear assembly 360 includes a gear ratio of greater than 10:1 such that the rotational speed of the lubricant dispersion device 356 is greater than ten times the rotational speed of the input shaft 337. The lubricant dispersion device 356 also includes a clutch 366. The lubrication system 300 and the gearbox assembly 302 operate substantially similar as to the lubrication system 200 and the gearbox assembly 46 of FIG. 2A, respectively. The clutch 366 engages or disengages the lubricant dispersion device 356 similar to the clutch 266 of FIG. 2A. In this way, rotation of the input shaft 337 causes the lubricant dispersion device 356 to rotate when the clutch 366 engages the lubricant dispersion device 356. The lubricant dispersion device 356 is prevented from rotating when the clutch 366 is disengaged.

Figure 4:
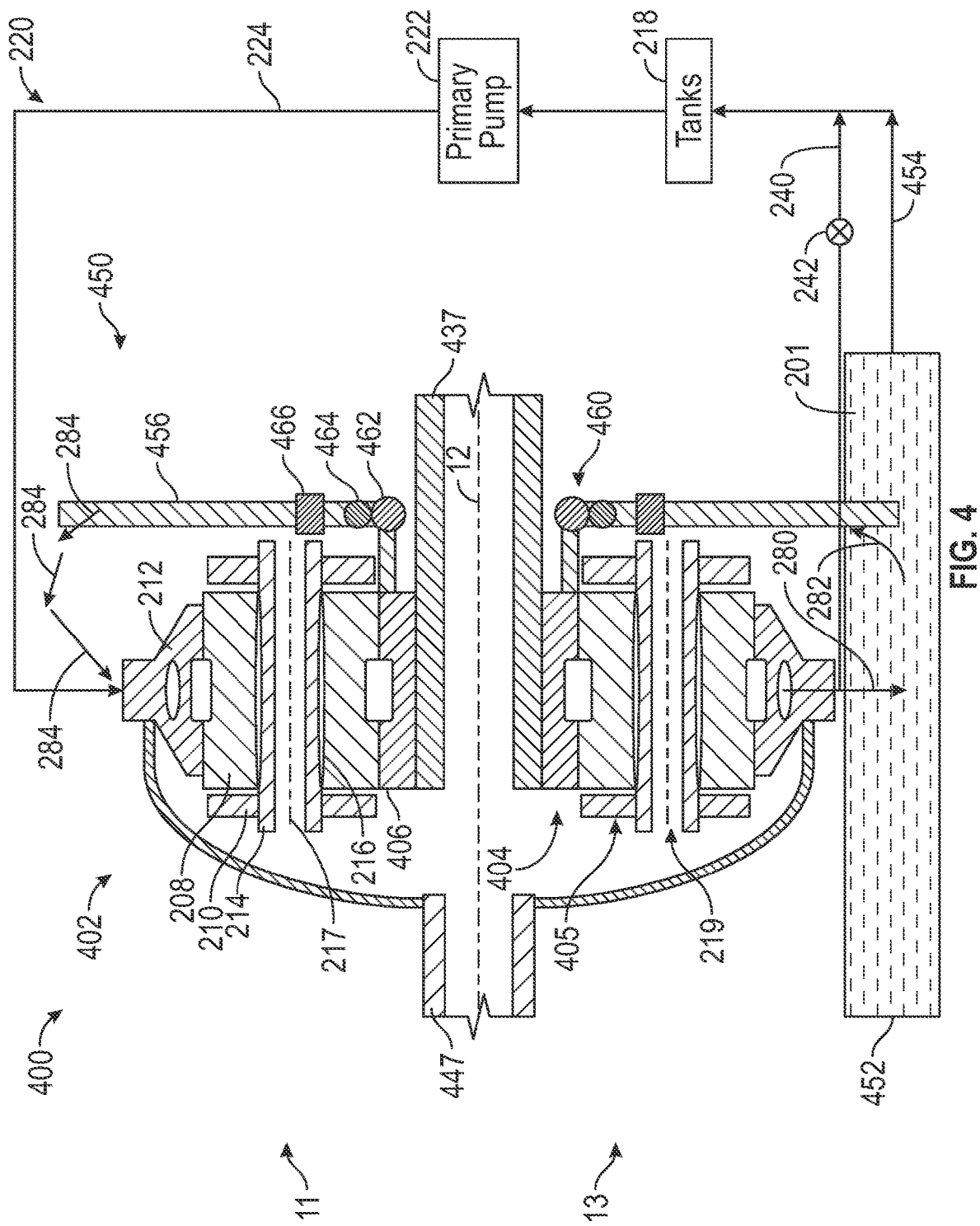
FIG. 4 is a schematic axial end cross-sectional view of a lubrication system for a gearbox assembly, taken along a latitudinal centerline axis of the gearbox assembly, according to another embodiment.

FIG. 4 is a schematic axial end cross-sectional view of a lubrication system 400 for a gearbox assembly 402 for a turbine engine, taken at a longitudinal centerline axis of the gearbox assembly 402, according to the present disclosure. The lubrication system 400 and the gearbox assembly 402 are substantially similar to the lubrication system 200 and the gearbox assembly 46 of FIG. 2A, respectively. The gearbox assembly 402 includes an input shaft 437 and an output shaft 447. The gearbox assembly 402 includes a gear assembly 404 having a plurality of gears 405 including a first gear 406, the one or more second gears 208, and the third gear 212. The first gear 406 is different than the first gear 206 of FIG. 2A, as detailed further below. The lubrication system 400 includes the primary lubrication system 220 and an auxiliary lubrication system 450. The auxiliary lubrication system 450 includes an auxiliary reservoir 452, an auxiliary lubricant return line 454, and a lubricant dispersion device 456.

The lubricant dispersion device 456 is substantially similar to the lubricant dispersion device 256 of FIGS. 2A and 2B, but the lubricant dispersion device 456 is drivingly coupled to the first gear 406. For example, the lubricant dispersion device 456 includes a lubricant dispersion device gear assembly 460 including a first lubricant dispersion device gear 462 and a second lubricant dispersion device gear 464. The first lubricant dispersion device gear 462 is coupled to the first gear 406 and the second lubricant dispersion device gear 464 is coupled to the lubricant dispersion device 456 and intermeshes with the first lubricant dispersion device gear 462. In one non-limiting embodiment, the lubricant dispersion device gear assembly 460 includes a gear ratio of greater than 10:1 such that the rotational speed of the lubricant dispersion device 456 is greater than ten times the rotational speed of the gear assembly 404. The lubricant dispersion device 456 also includes a clutch 466. The lubrication system 400 and the gearbox assembly 402 operate substantially similar as to the lubrication system 200 and the gearbox assembly 46 of FIG. 2A, respectively. The clutch 466 engages or disengages the lubricant dispersion device 456 similar to the clutch 266 of FIG. 2A. In this way, rotation of the first gear 406 causes the lubricant dispersion device 456 to rotate when the clutch 466 engages the lubricant dispersion device 456. The lubricant dispersion device 456 is prevented from rotating when the clutch 466 is disengaged. While the lubricant dispersion device 456 is drivingly coupled to the first gear 406, the lubricant dispersion device 456 can be coupled to any of the components of the gear assembly 404, such as, for example, any of the plurality of gears 405, the planet carrier 210, or the pin 214.

Figure 5A:
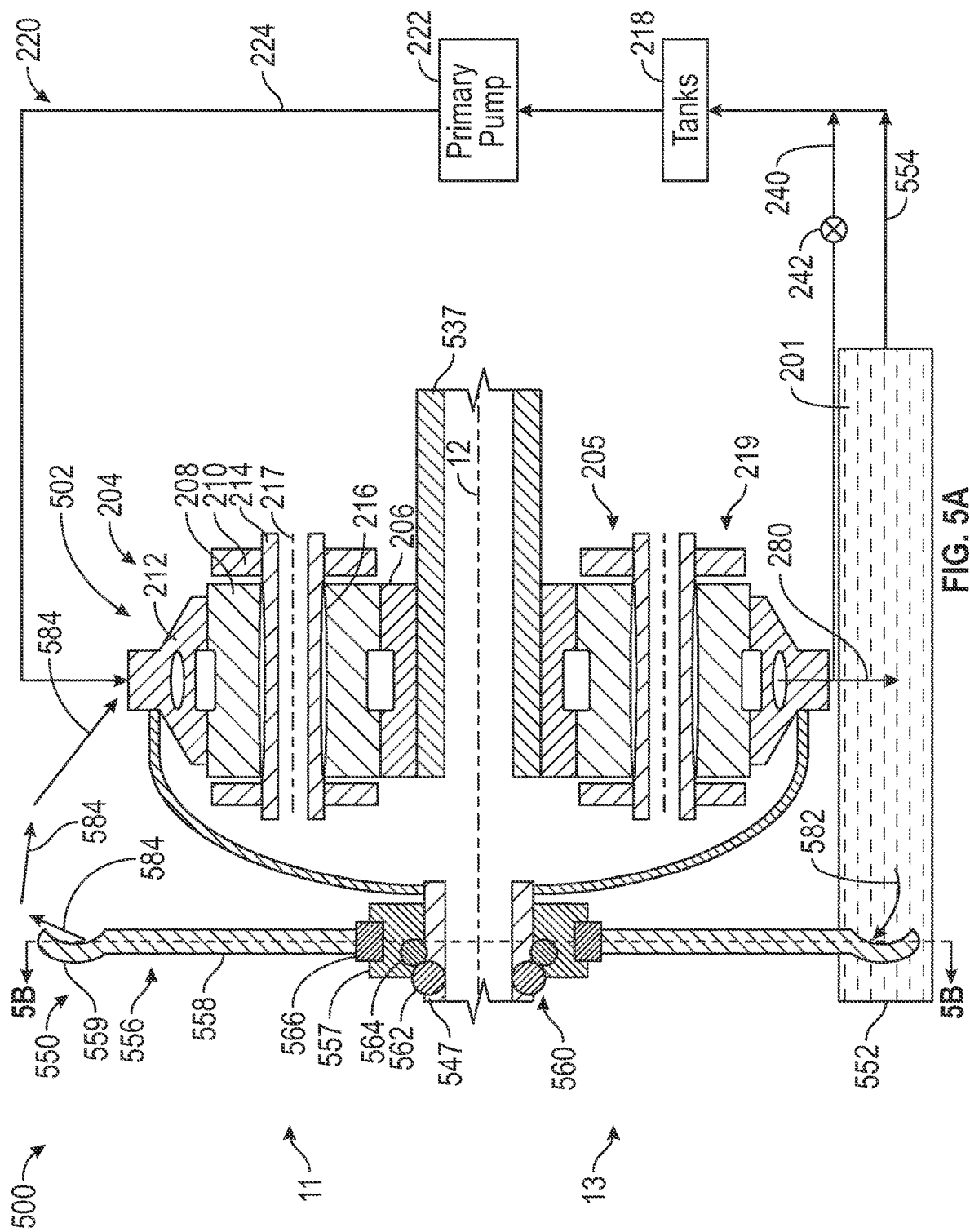
FIG. 5A is a schematic axial end cross-sectional view of a lubrication system for a gearbox assembly for a turbine engine, taken along a latitudinal centerline axis of the gearbox assembly, according to another embodiment.
Figure 5B:
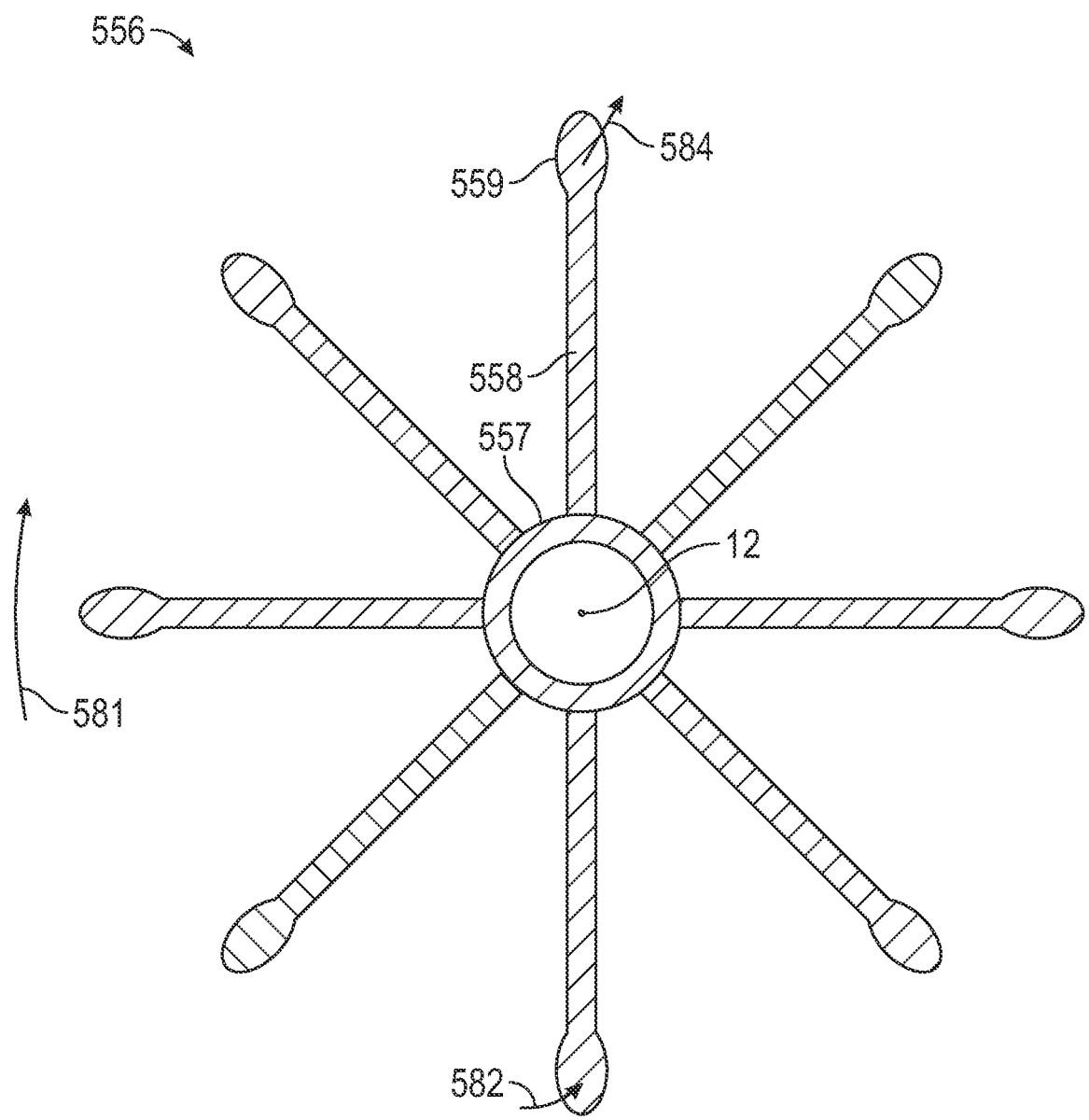
FIG. 5B is a schematic cross-sectional aft view of a lubricant dispersion device of the lubrication system of FIG. 5A, taken along plane 5B-5B in FIG. 5A, and isolated from the lubrication system, according to the present disclosure.

FIG. 5A is a schematic axial end cross-sectional view of a lubrication system 500 for a gearbox assembly 502 for a turbine engine, taken at a longitudinal centerline axis of the gearbox assembly 502, according to another embodiment. FIG. 5B is a schematic cross-sectional aft view of the lubricant dispersion device 556 of the lubrication system 500, taken at plane 5B-5B in FIG. 5A, and isolated from the lubrication system 500, according to the present disclosure. The lubrication system 500 and the gearbox assembly 502 are substantially similar to the lubrication system 200 and the gearbox assembly 46 of FIG. 2A, respectively. The gearbox assembly 502 includes an input shaft 537 and an output shaft 547. The lubrication system 500 includes the primary lubrication system 220 and an auxiliary lubrication system 550. The auxiliary lubrication system 550 includes an auxiliary reservoir 552, an auxiliary lubricant return line 554, and the lubricant dispersion device 556. The lubricant dispersion device 556 is different from the lubricant dispersion device 256 of FIG. 2A.

The lubricant dispersion device 556 includes a hub 557 and a plurality of arms 558 that extend from the hub 557. The plurality of arms 558 are spaced circumferentially about the hub 557 as shown in FIG. 5B. FIG. 5A shows two of the plurality of arms 558 and FIG. 5B shows eight of the plurality of arms 558. The lubricant dispersion device 556 can include any number of arms 558. Each of the plurality of arms 558 includes a scoop portion 559 that is shaped to scoop the lubricant 201 in the auxiliary reservoir 552, as detailed further below. For example, the scoop portion 559 has a generally crescent shape such that the scoop portion 559 is curved to scoop the lubricant 201 into the scoop portion 559 and to disperse the lubricant 201 to the one or more rotating components 219. In this way, the scoop portion 559 is shaped substantially like a spoon.

The lubricant dispersion device 556 includes a lubricant dispersion device gear assembly 560 including a first lubricant dispersion device gear 562 and a second lubricant dispersion device gear 564. The first lubricant dispersion device gear 562 is coupled to the output shaft 547 and the second lubricant dispersion device gear 564 is coupled to the lubricant dispersion device 556, and intermeshes with the first lubricant dispersion device gear 562. The lubricant dispersion device 556 also includes a clutch 566. The lubricant dispersion device gear assembly 560 and the clutch 566 are removed from the view of FIG. 5B for clarity. While the lubricant dispersion device 556 is coupled to the output shaft 547 in FIG. 5A, the lubricant dispersion device 556 can be coupled to the input shaft 537 or to the gear assembly 204, similar to the embodiments of FIGS. 3 and 4, respectively. In this way, the lubricant dispersion device 556 is coupled to at least one of the output shaft 547, the input shaft 537, or the gear assembly 204. In one non-limiting embodiment, the lubricant dispersion device gear assembly 560 includes a gear ratio of greater than 10:1 such that the rotational speed of the lubricant dispersion device 556 is greater than ten times the rotational speed of the at least one of the output shaft 547, the input shaft 537, or the gear assembly 204.

The lubrication system 500 and the gearbox assembly 502 operate substantially similar as to the lubrication system 200 and the gearbox assembly 46 of FIG. 2A, respectively. The clutch 566 engages or disengages the lubricant dispersion device 556 similar to the clutch 266 of FIG. 2A. In this way, rotation of the first gear 206 causes the lubricant dispersion device 556 to rotate when the clutch 566 engages the lubricant dispersion device 556. The lubricant dispersion device 556 is prevented from rotating when the clutch 566 is disengaged. While the lubricant dispersion device 556 is drivingly coupled to the output shaft 547, the lubricant dispersion device 556 can be coupled to the input shaft 537 (e.g., similar as to FIG. 3), or to any of the components of the gear assembly 204, such as, for example, any of the plurality of gears 205 (e.g., similar as to FIG. 4), the planet carrier 210, or the pin 214.

The auxiliary reservoir 552 fills with the lubricant 201 such that the lubricant 201 in the auxiliary reservoir 552 contacts a portion (e.g., the bottom portion 13) of the lubricant dispersion device 556. For example, each of the plurality of arms 558 has a length such that the scoop portion 559 of each of the plurality of arms 558 extends into the auxiliary reservoir 552 and contacts a portion of the lubricant 201 in the auxiliary reservoir 552 when each of the plurality of arms 558 rotates to the bottom portion 13. When the primary lubrication system 220 is inoperative (e.g., during windmilling, during a shutdown of the turbine engine 10, etc.), the clutch 566 engages the lubricant dispersion device 556 such that the rotation of the output shaft 47 causes the lubricant dispersion device 556 to rotate (as indicated by arrow 581 in FIG. 5B), as detailed above. As the lubricant dispersion device 556 rotates, the scoop portion 559 of each of the plurality of arms 558 collects a portion of the lubricant 201 in the auxiliary reservoir 552 (as indicated by arrow 582). The rotation of the lubricant dispersion device 556 causes each of the plurality of arms 558 to rotate from the bottom portion 13 to the top portion 11 such that the scoop portion 559 carries the portion of the lubricant 201 to the top portion 11. At the top portion 11, the rotation of the lubricant dispersion device 556 then causes the portion of the lubricant 201 to separate from the scoop portion 559 such that the lubricant dispersion device 556 disperses the portion of the lubricant 201 to the one or more rotating components 219 (e.g., to the top portion 11 of the gear assembly 204) (as indicated by arrows 584). For example, the scoop portion 559 is shaped (e.g., includes a curve) that directs the portion of the lubricant 201 towards the one or more rotating components 219 when each of the plurality of arms 558 rotates to the top portion 11.

In this way, the lubricant dispersion device 556 collects the portion of the lubricant 201 in the auxiliary reservoir 552 as the scoop portion 559 of each of the plurality of arms 558 rotates through the auxiliary reservoir 552. In this way, the auxiliary lubrication system 550 supplies the lubricant 201 to the one or more rotating components 219 (e.g., the plurality of gears 205 of the gear assembly 204 and to the one or more gearbox bearings 216) even if the primary lubrication system 220 loses pressure and the primary lubrication system 220 is unable to supply the lubricant 201 through the primary lubricant supply line 224.

Figure 6:
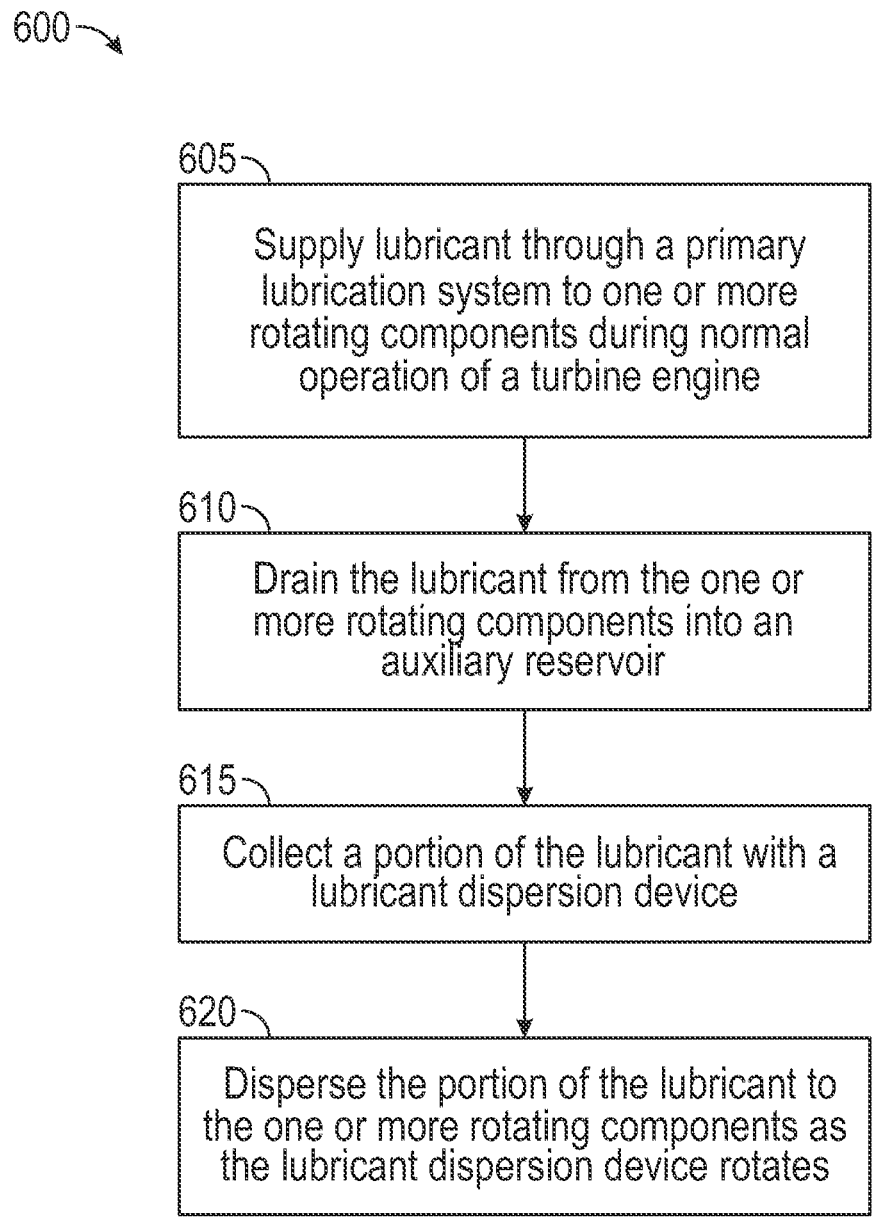
FIG. 6 is a flow diagram of a method of operating a lubrication system, according to the present disclosure.

FIG. 6 is a flow diagram of a method 600 of operating the lubrication system 200, 300, 400, 500. The lubrication system 200, 300, 400, 500 can be any of the lubrication systems detailed herein. In step 605, the method 600 includes supplying the lubricant 201 through the primary lubrication system 220 to the one or more rotating components 219 during normal operation of the turbine engine 10. For example, the method 600 includes pumping, with the primary pump 222, the lubricant 201 to the one or more rotating components 219 through the primary lubricant supply line 224.

In step 610, the method 600 includes draining the lubricant 201 from the one or more rotating components 219 into the auxiliary reservoir 252, 352, 452, 552. For example, the method 600 includes draining the lubricant 201 through the auxiliary lubricant return line 254, 354, 454, 554. In some embodiments, the method 600 includes draining the lubricant 201 from the one or more rotating components 219 to the one or more tanks 218 through the primary lubricant return line 240 during normal operation of the turbine engine 10. The method 600 can include opening the one or more drain valves 242 to drain the lubricant 201 from the one or more rotating components 219 through the primary lubricant return line 240. The method 600 can include closing the one or more drain valves 242 to cause the lubricant 201 to drain into the auxiliary reservoir 252, 352, 452, 552.

In step 615, the method 600 includes collecting a portion of the lubricant 201 in the auxiliary reservoir 252, 352, 452, 552 with the lubricant dispersion device 256, 356, 456, 556. In step 620, the method 600 includes dispersing the portion of the lubricant 201 to the one or more rotating components as the lubricant dispersion device rotates. In some embodiments, the method 600 includes scooping the lubricant 201 in the auxiliary reservoir 252, 352, 452, 552 with the scoop portion 559 of the lubricant dispersion device 556. The method 600 includes dispersing the lubricant 201 to the one or more rotating components 219 with the scoop portion 559.

In some embodiments, the lubricant dispersion device 256, 356, 456, 556 is coupled to at least one of the output shaft 47, 347, 447, 547 or the input shaft 37, 337, 437, 537, and the method 600 includes causing the lubricant dispersion device 256, 356, 456, 556 to rotate with rotation of the at least one of the output shaft 47, 347, 447, 547 or the input shaft 37, 337, 437, 537. In some embodiments, the lubricant dispersion device 256, 356, 456, 556 is drivingly coupled to the gear assembly 204, 404, and the method 600 further includes causing the lubricant dispersion device 256, 356, 456, 556 to rotate with rotation of the gear assembly 204, 404. In some embodiments, the method 600 includes rotating the lubricant dispersion device 256, 356, 456, 556 in a first rotational direction of the fan 38. The method 600 can include rotating the lubricant dispersion device 256, 356, 456, 556 in a second rotational direction of the fan 38. The second rotational direction is opposite the first rotational direction.

In some embodiments, the method 600 includes rotating the lubricant dispersion devices 256, 356, 456, 556 when the primary lubrication system 220 is unable to supply the lubricant 201 to the one or more rotating components 219. The method 600 includes preventing the lubricant dispersion devices 256, 356, 456, 556 from rotating when the primary lubrication system 220 is supplying the lubricant 201 to the one or more rotating components 219.

In some embodiments, the method 600 can include rotating the lubricant dispersion device 256, 356, 456, 556 based on at least one of the pressure of the lubricant in the primary lubrication system 220, a pressure of fuel in the turbine engine 10, or a pressure of hydraulics in the turbine engine 10. The method 600 includes rotating the lubricant dispersion device 256, 356, 456, 556 when the at least one of the pressure of the lubricant in the primary lubrication system 220, the pressure of the fuel in the turbine engine 10, or the pressure of the hydraulics in the turbine engine 10 is less than a primary pressure threshold. The method 600 further includes preventing the lubricant dispersion device 256, 356, 456, 556 from rotating when the at least one of the pressure of the lubricant in the primary lubrication system 220, the pressure of the fuel in the turbine engine 10, or the pressure of the hydraulics in the turbine engine 10 is greater than the primary pressure threshold.

In some embodiments, the method 600 can include rotating the lubricant dispersion device 256, 356, 456, 556 based on a speed of the turbo-engine 16. The method 600 can include rotating the lubricant dispersion device 256, 356, 456, 556 when the speed of the turbo-engine 16 is less than a speed threshold. The method can include preventing the lubricant dispersion device 256, 356, 456, 556 from rotating when the speed of the turbo-engine 16 is greater than the speed threshold.

In some embodiments, the method 600 can include rotating the lubricant dispersion device 256, 356, 456, 556 when the controller 102 turns off. The method 600 can include preventing the lubricant dispersion device 256, 356, 456, 556 from rotating when the controller 102 turns on.

In some embodiments, the method 600 includes engaging, with the clutch 266, 366, 466, 566, the lubricant dispersion device 256, 356, 456, 556 such that the lubricant dispersion device 256, 356, 456, 556 rotates. The method 600 can include disengaging, with the clutch 266, 366, 466, 566, the lubricant dispersion device 256, 356, 456, 556 to prevent the lubricant dispersion device 256, 356, 456, 556 from rotating. The method 600 can include engaging the lubricant dispersion device 256, 356, 456, 556 with the clutch 266, 366, 466, 566 when the primary lubrication system 220 is unable to supply the lubricant 201 to the one or more rotating components 219. The method 600 can include disengaging the lubricant dispersion device 256, 356, 456, 556 with the clutch 266, 366, 466, 566 when the primary lubrication system 220 is supplying the lubricant 201 to the one or more rotating components 219.

In some embodiments, the method 600 includes engaging or disengaging the lubricant dispersion device 256, 356, 456, 556 with the clutch 266, 366, 466, 566 based on the rotational speed of the least one of the output shaft 47, 347, 447, 547, the input shaft 37, 337, 437, 537, or the gear assembly 204, 404. The method 600 can include engaging the lubricant dispersion device 256, 356, 456, 556 with the clutch 266, 366, 466, 566 when the rotational speed of the at least one of the output shaft 47, 347, 447, 547, the input shaft 37, 337, 437, 537, or the gear assembly 204, 404 is less than a rotational speed threshold. The method 600 can include disengaging the lubricant dispersion device 256, 356, 456, 556 with the clutch 266, 366, 466, 566 when the rotational speed of the at least one of the output shaft 47, 347, 447, 547, the input shaft 37, 337, 437, 537, or the gear assembly 204, 404 is greater than the rotational speed threshold.

In some embodiments, the method 600 includes engaging or disengaging the lubricant dispersion device 256, 356, 456, 556 with the clutch 266, 366, 466, 566 based on a pressure of the lubricant 201 in the primary lubrication system 220. The method 600 can include engaging the lubricant dispersion device 256, 356, 456, 556 with the clutch 266, 366, 466, 566 when the pressure of the lubricant 201 in the primary lubrication system 220 is less than a primary pressure threshold. The method 600 can include disengaging the lubricant dispersion device 256, 356, 456, 556 with the clutch 266, 366, 466, 566 when the pressure of the lubricant 201 in the primary lubrication system 220 is greater than the primary pressure threshold.

In some embodiments, the method 600 includes engaging or disengaging the lubricant dispersion device 256, 356, 456, 556 with the clutch 266, 366, 466, 566 based on at least one of the pressure of the lubricant 201 in the primary lubrication system 220, a pressure of fuel in the turbine engine 10, or a pressure of hydraulics in the turbine engine 10. The method 600 can include engaging the lubricant dispersion device 256, 356, 456, 556 with the clutch 266, 366, 466, 566 when the at least one of the pressure of the lubricant 201 in the primary lubrication system 220, the pressure of the fuel in the turbine engine 10, or the pressure of the hydraulics in the turbine engine 10 is less than a primary pressure threshold. The method 600 can include disengaging the lubricant dispersion device 256, 356, 456, 556 with the clutch 266, 366, 466, 566 when the at least one of the pressure of the lubricant 201 in the primary lubrication system 220, the pressure of the fuel in the turbine engine 10, or the pressure of the hydraulics in the turbine engine 10 is greater than the primary pressure threshold.

In some embodiments, the method 600 includes engaging the lubricant dispersion device 256, 356, 456, 556 with the clutch 266, 366, 466, 566 when the controller 102 turns off. The method 600 can include disengaging the lubricant dispersion device 256, 356, 456, 556 with the clutch 266, 366, 466, 566 when the controller 102 turns on.

Accordingly, the present disclosure provides for supplying the lubricant to the one or more rotating components (e.g., the gears or the gearbox bearings of the gear assembly) during a shutdown of the turbine engine or other loss of pressure scenarios (e.g., while the turbine engine is operating). The lubrication system herein supplies the lubricant during windmilling and loss of pressure scenarios regardless of a rotational direction of the fan. For example, the auxiliary lubrication system supplies the lubricant to the one or more rotating components whether the fan is rotating in a first rotational direction or in a second rotational direction that is opposite the first rotational direction. In some embodiments, the auxiliary lubrication system operates passively, for example, based on the pressure of the lubricant from the lubricant pressure signal line, and operates independently of the controller. In this way, the auxiliary lubrication system can operate even if there is a controller failure.

The lubricant dispersion devices of the present disclosure disperse the lubricant in the auxiliary reservoir to the one or more rotating components when the primary lubrication system is unable to supply the lubricant to the one or more rotating components. The lubricant dispersion devices, being drivingly coupled to the output shaft, the input shaft, or the components of the gear assembly, ensures that the lubricant dispersion devices rotate while the output shaft, the input shaft, or the components of the gear assembly rotate. In this way, the lubricant dispersion devices disperse the lubricant the to the one or more rotating components even if the fan is windmilling while the turbine engine is operating or while the turbine engine is shut down. Further, the lubricant dispersion devices reduce complexity and weight of the lubrication system by supplying the lubricant to the one or more rotating components without the use of a pump.

Further aspects of the present disclosure are provided by the subject matter of the following clauses.

A lubrication system for a turbine engine having a longitudinal centerline axis and one or more rotating components. The lubrication system comprises a primary lubrication system that supplies lubricant to the one or more rotating components during normal operation of the turbine engine, and an auxiliary lubrication system. The auxiliary lubrication system comprises an auxiliary reservoir that stores the lubricant therein, and a lubricant dispersion device that rotates about the longitudinal centerline axis, the lubricant dispersion device collecting the lubricant in the auxiliary reservoir and dispersing the lubricant to the one or more rotating components as the lubricant dispersion device rotates.

The lubrication system of the preceding clause, the turbine engine comprising a fan, a turbo-engine, an output shaft coupled to the fan, and an input shaft coupled to the turbo-engine.

The lubrication system of any preceding clause, the lubricant dispersion device being drivingly coupled to at least one of the output shaft or the input shaft such that rotation of the at least one of the output shaft or the input shaft causes the lubricant dispersion device to rotate.

The lubrication system of any preceding clause, the turbine engine comprising a gear assembly, the output shaft drivingly coupled to the input shaft through the gear assembly.

The lubrication system of the preceding clause, the gear assembly including a plurality of gears and one or more gearbox bearings.

The lubrication system of any preceding clause, the one or more rotating components being at least one of the plurality of gears or the one or more gearbox bearings.

The lubrication system of any preceding clause, the lubricant dispersion device being drivingly coupled to the gear assembly such that rotation of the gear assembly causes the lubricant dispersion device to rotate.

The lubrication system of any preceding clause, the lubricant dispersion device being drivingly coupled to at least one of the output shaft, the input shaft, or the gear assembly.

The lubrication system of any preceding clause, the auxiliary lubrication system comprising a lubricant dispersion device gear assembly, and the lubricant dispersion device being drivingly coupled to the at least one of the output shaft, the input shaft, or the gear assembly through the lubricant dispersion device gear assembly.

The lubrication system of any preceding clause, the lubricant dispersion device gear assembly having a gear ratio such that a rotational speed of the lubricant dispersion device is greater than a rotational speed of the at least one of the output shaft, the input shaft, or the gear assembly.

The lubrication system of the preceding clause, the gear ratio being greater than or equal to 10:1 such that the rotational speed of the lubricant dispersion device is at least ten times greater than the rotational speed of the at least one of the output shaft, the input shaft, or the gear assembly.

The lubrication system of any preceding clause, the lubricant dispersion device gear assembly including a first lubricant dispersion device gear coupled to the at least one of the output shaft, the input shaft, or the gear assembly, and a second lubricant dispersion device gear coupled to the lubricant dispersion device, the second lubricant dispersion device gear being intermeshed with the first lubricant dispersion device gear.

The lubrication system of any preceding clause, the auxiliary lubrication system causing the lubricant dispersion device to rotate when the primary lubrication system is unable to supply the lubricant to the one or more rotating components.

The lubrication system of any preceding clause, the auxiliary lubrication system preventing the lubricant dispersion device from rotating when the primary lubrication system is supplying the lubricant to the one or more rotating components.

The lubrication system of any preceding clause, the auxiliary lubrication system causing the lubricant dispersion device to rotate based on at least one of the pressure of the lubricant in the primary lubrication system, a pressure of fuel in the turbine engine, or a pressure of hydraulics in the turbine engine.

The lubrication system of any preceding clause, the auxiliary lubrication system causing the lubricant dispersion device to rotate when the at least one of the pressure of the lubricant in the primary lubrication system, the pressure of the fuel in the turbine engine, or the pressure of the hydraulics in the turbine engine is less than a primary pressure threshold.

The lubrication system of any preceding clause, the auxiliary lubrication system preventing the lubricant dispersion device from rotating when the at least one of the pressure of the lubricant in the primary lubrication system, the pressure of the fuel in the turbine engine, or the pressure of the hydraulics in the turbine engine is greater than the primary pressure threshold.

The lubrication system of any preceding clause, the auxiliary lubrication system causing the lubricant dispersion device to rotate based on a speed of the turbo-engine.

The lubrication system of any preceding clause, the auxiliary lubrication system causing the lubricant dispersion device to rotate when the speed of the turbo-engine is less than a speed threshold.

The lubrication system of any preceding clause, the auxiliary lubrication system preventing the lubricant dispersion device from rotating when the speed of the turbo-engine is greater than the speed threshold.

The lubrication system of any preceding clause, the speed threshold being at least 5% of a maximum speed of the turbo-engine.

The lubrication system of any preceding clause, the speed threshold being 5% to 10% of the maximum speed of the turbo-engine.

The lubrication system of any preceding clause, the turbine engine further comprising a controller, and the auxiliary lubrication system causing the lubricant dispersion device to rotate when the controller turns off.

The lubrication system of any preceding clause, the auxiliary lubrication system preventing the lubricant dispersion device from rotating when the controller turns on.

The lubrication system of any preceding clause, the auxiliary lubrication system comprising a clutch that engages the lubricant dispersion device such that the lubricant dispersion device rotates or that disengages the lubricant dispersion device to prevent the lubricant dispersion device from rotating.

The lubrication system of any preceding clause, the clutch engaging the lubricant dispersion device when the primary lubrication system is unable to supply the lubricant to the one or more rotating components.

The lubrication system of any preceding clause, the clutch disengaging the lubricant dispersion device when the primary lubrication system is supplying the lubricant to the one or more rotating components.

The lubrication system of any preceding clause, the clutch being a centrifugal clutch that engages or disengages the lubricant dispersion device based on the rotational speed of the least one of the output shaft, the input shaft, or the gear assembly.

The lubrication system of any preceding clause, the clutch engaging the lubricant dispersion device when the rotational speed of the at least one of the output shaft, the input shaft, or the gear assembly is less than a rotational speed threshold.

The lubrication system of any preceding clause, the clutch disengaging the lubricant dispersion device when the rotational speed of the at least one of the output shaft, the input shaft, or the gear assembly is greater than the rotational speed threshold.

The lubrication system of any preceding clause, the clutch engaging or disengaging the lubricant dispersion device based on a pressure of the lubricant in the primary lubrication system.

The lubrication system of any preceding clause, the clutch engaging the lubricant dispersion device when the pressure of the lubricant in the primary lubrication system is less than a primary pressure threshold.

The lubrication system of any preceding clause, the clutch disengaging the lubricant dispersion device when the pressure of the lubricant in the primary lubrication system is greater than the primary pressure threshold.

The lubrication system of any preceding clause, the clutch engaging or disengaging the lubricant dispersion device based on at least one of the pressure of the lubricant in the primary lubrication system, a pressure of fuel in the turbine engine, or a pressure of hydraulics in the turbine engine.

The lubrication system of any preceding clause, the clutch engaging the lubricant dispersion device when the at least one of the pressure of the lubricant in the primary lubrication system, the pressure of the fuel in the turbine engine, or the pressure of the hydraulics in the turbine engine is less than a primary pressure threshold.

The lubrication system of any preceding clause, the clutch disengaging the lubricant dispersion device when the at least one of the pressure of the lubricant in the primary lubrication system, the pressure of the fuel in the turbine engine, or the pressure of the hydraulics in the turbine engine is greater than the primary pressure threshold.

The lubrication system of any preceding clause, the clutch engaging the lubricant dispersion device when the controller turns off.

The lubrication system of any preceding clause, the clutch disengaging the lubricant dispersion device when the controller turns on.

The lubrication system of any preceding clause, the auxiliary lubrication system comprising an auxiliary lubricant return line in fluid communication with the auxiliary reservoir and the primary lubrication system, the lubricant draining from the auxiliary reservoir to the primary lubrication system through the auxiliary lubricant return line.

The lubrication system of any preceding clause, the primary lubrication system comprising a primary pump and a primary lubricant supply line, the primary pump pumping the lubricant to the one or more rotating components through the primary lubricant supply line.

The lubrication system of any preceding clause, further comprising one or more tanks and a primary lubricant return line, the lubricant draining from the one or more rotating components to the one or more tanks through the primary lubricant return line during normal operation of the turbine engine.

The lubrication system of any preceding clause, further comprising one or more drain valves in fluid communication with the primary lubrication system.

The lubrication system of any preceding clause, the one or more drain valves opening to drain the lubricant from the one or more rotating components through the primary lubricant return line.

The lubrication system of any preceding clause, the one or more drain valves closing to cause the lubricant to drain into the auxiliary reservoir.

The lubrication system of any preceding clause, the turbine engine further comprising a fan shaft coupled to the fan, the output shaft being the fan shaft.

The lubrication system of any preceding clause, the turbine engine further comprising a low-pressure shaft coupled to the turbo-engine, the input shaft being the low-pressure shaft.

The lubrication system of any preceding clause, the gear assembly comprising a plurality of gears.

The lubrication system of any preceding clause, the lubricant dispersion device being drivingly coupled to at least one of the plurality of gears.

The lubrication system of any preceding clause, the gear assembly further comprising a planet carrier, the lubricant dispersion device being drivingly coupled to the planet carrier.

The lubrication system of any preceding clause, the gear assembly further comprising a pin disposed through at least one of the plurality of gears, the lubricant dispersion device being drivingly coupled to the pin.

The lubrication system of any preceding clause, the lubricant dispersion device being an annular disk that is annular about the longitudinal centerline axis.

The lubrication system of any preceding clause, the lubricant dispersion device including a hub and a plurality of arms coupled to the hub.

The lubrication system of any preceding clause, each of the plurality of arms including a scoop portion that scoops the lubricant in the auxiliary reservoir and disperses the lubricant to the one or more rotating components.

The lubrication system of any preceding clause, the scoop portion of each of the plurality of arms having a generally crescent shape.

The lubrication system of any preceding clause, the lubricant dispersion device rotating in a first rotational direction of the fan, and in a second rotational direction of the fan, the second rotational direction being opposite the first rotational direction.

A turbine engine comprising a fan, a turbo-engine, an output shaft coupled to the fan, an input shaft coupled to the turbo-engine, and the lubrication system of any preceding clause.

A method of operating the lubrication system of any preceding clause, the method comprising supplying the lubricant from the primary reservoir through the primary lubrication system to the one or more rotating components during normal operation of the turbine engine, draining the lubricant from the one or more rotating components into the auxiliary reservoir, collecting a portion of the lubricant with the lubricant dispersion device, and dispersing the portion of the lubricant to the one or more rotating components as the lubricant dispersion device rotates.

The method of the preceding clause, the turbine engine comprising a fan, a turbo-engine, an output shaft coupled to the fan, and an input shaft coupled to the turbo-engine.

The method of any preceding clause, the lubricant dispersion device being drivingly coupled to at least one of the output shaft or the input shaft, and the method further comprising causing the lubricant dispersion device to rotate with rotation of the at least one of the output shaft or the input shaft.

The method of any preceding clause, the turbine engine comprising a gear assembly, the output shaft drivingly coupled to the input shaft through the gear assembly.

The method of the preceding clause, the gear assembly including a plurality of gears and one or more gearbox bearings.

The method of any preceding clause, the one or more rotating components being at least one of the plurality of gears or the one or more gearbox bearings.

The method of any preceding clause, the lubricant dispersion device being drivingly coupled to the gear assembly, and the method further comprising causing the lubricant dispersion device to rotate with rotation of the gear assembly.

The method of any preceding clause, the lubricant dispersion device being drivingly coupled to at least one of the output shaft, the input shaft, or the gear assembly.

The method of any preceding clause, the auxiliary lubrication system comprising a lubricant dispersion device gear assembly, and the lubricant dispersion device being drivingly coupled to the at least one of the output shaft, the input shaft, or the gear assembly through the lubricant dispersion device gear assembly.

The method of any preceding clause, the lubricant dispersion device gear assembly having a gear ratio such that a rotational speed of the lubricant dispersion device is greater than a rotational speed of the at least one of the output shaft, the input shaft, or the gear assembly.

The method of the preceding clause, the gear ratio being greater than or equal to 10:1 such that the rotational speed of the lubricant dispersion device is at least ten times greater than the rotational speed of the at least one of the output shaft, the input shaft, or the gear assembly.

The method of any preceding clause, the lubricant dispersion device gear assembly including a first lubricant dispersion device gear coupled to the at least one of the output shaft, the input shaft, or the gear assembly, and a second lubricant dispersion device gear coupled to the lubricant dispersion device, the second lubricant dispersion device gear being intermeshed with the first lubricant dispersion device gear.

The method of any preceding clause, further comprising rotating the lubricant dispersion device when the primary lubrication system is unable to supply the lubricant to the one or more rotating components.

The method of any preceding clause, further comprising preventing the lubricant dispersion device from rotating when the primary lubrication system is supplying the lubricant to the one or more rotating components.

The method of any preceding clause, further comprising rotating the lubricant dispersion device based on at least one of the pressure of the lubricant in the primary lubrication system, a pressure of fuel in the turbine engine, or a pressure of hydraulics in the turbine engine.

The method of any preceding clause, further comprising rotating the lubricant dispersion device when the at least one of the pressure of the lubricant in the primary lubrication system, the pressure of the fuel in the turbine engine, or the pressure of the hydraulics in the turbine engine is less than a primary pressure threshold.

The method of any preceding clause, further comprising preventing the lubricant dispersion device from rotating when the at least one of the pressure of the lubricant in the primary lubrication system, the pressure of the fuel in the turbine engine, or the pressure of the hydraulics in the turbine engine is greater than the primary pressure threshold.

The method of any preceding clause, further comprising rotating the lubricant dispersion device based on a speed of the turbo-engine.

The method of any preceding clause, further comprising rotating the lubricant dispersion device when the speed of the turbo-engine is less than a speed threshold.

The method of any preceding clause, further comprising preventing the lubricant dispersion device from rotating when the speed of the turbo-engine is greater than the speed threshold.

The method of any preceding clause, the speed threshold being at least 5% of a maximum speed of the turbo-engine.

The method of any preceding clause, the speed threshold being 5% to 10% of the maximum speed of the turbo-engine.

The method of any preceding clause, the turbine engine further comprising a controller, and the method further comprising rotating the lubricant dispersion device when the controller turns off.

The method of any preceding clause, further comprising preventing the lubricant dispersion device from rotating when the controller turns on.

The method of any preceding clause, the auxiliary lubrication system comprising a clutch, and the method further comprising engaging, with the clutch, the lubricant dispersion device such that the lubricant dispersion device rotates, and disengaging, with the clutch, the lubricant dispersion device to prevent the lubricant dispersion device from rotating.

The method of any preceding clause, further comprising engaging the lubricant dispersion device with the clutch when the primary lubrication system is unable to supply the lubricant to the one or more rotating components.

The method of any preceding clause, further comprising disengaging the lubricant dispersion device with the clutch when the primary lubrication system is supplying the lubricant to the one or more rotating components.

The method of any preceding clause, the clutch being a centrifugal clutch, and the method further comprising engaging or disengaging the lubricant dispersion device with the clutch based on the rotational speed of the least one of the output shaft, the input shaft, or the gear assembly.

The method of any preceding clause, further comprising engaging the lubricant dispersion device with the clutch when the rotational speed of the at least one of the output shaft, the input shaft, or the gear assembly is less than a rotational speed threshold.

The method of any preceding clause, further comprising disengaging the lubricant dispersion device with the clutch when the rotational speed of the at least one of the output shaft, the input shaft, or the gear assembly is greater than the rotational speed threshold.

The method of any preceding clause, further comprising engaging or disengaging the lubricant dispersion device with the clutch based on a pressure of the lubricant in the primary lubrication system.

The method of any preceding clause, further comprising engaging the lubricant dispersion device with the clutch when the pressure of the lubricant in the primary lubrication system is less than a primary pressure threshold.

The method of any preceding clause, further comprising disengaging the lubricant dispersion device with the clutch when the pressure of the lubricant in the primary lubrication system is greater than the primary pressure threshold.

The method of any preceding clause, further comprising engaging or disengaging the lubricant dispersion device with the clutch based on at least one of the pressure of the lubricant in the primary lubrication system, a pressure of fuel in the turbine engine, or a pressure of hydraulics in the turbine engine.

The method of any preceding clause, further comprising engaging the lubricant dispersion device with the clutch when the at least one of the pressure of the lubricant in the primary lubrication system, the pressure of the fuel in the turbine engine, or the pressure of the hydraulics in the turbine engine is less than a primary pressure threshold.

The method of any preceding clause, further comprising disengaging the lubricant dispersion device with the clutch when the at least one of the pressure of the lubricant in the primary lubrication system, the pressure of the fuel in the turbine engine, or the pressure of the hydraulics in the turbine engine is greater than the primary pressure threshold.

The method of any preceding clause, further comprising engaging the lubricant dispersion device with the clutch when the controller turns off.

The method of any preceding clause, further comprising disengaging the lubricant dispersion device with the clutch when the controller turns on.

The method of any preceding clause, the auxiliary lubrication system comprising an auxiliary lubricant return line in fluid communication with the auxiliary reservoir and the primary lubrication system, and the method further comprising draining the lubricant from the auxiliary reservoir to the primary lubrication system through the auxiliary lubricant return line.

The method of any preceding clause, the primary lubrication system comprising a primary pump and a primary lubricant supply line, and the method further comprising pumping, with the primary pump, the lubricant to the one or more rotating components through the primary lubricant supply line.

The method of any preceding clause, the lubrication system further comprising one or more tanks and a primary lubricant return line, and the method further comprising draining the lubricant from the one or more rotating components to the one or more tanks through the primary lubricant return line during normal operation of the turbine engine.

The method of any preceding clause, the lubrication system further comprising one or more drain valves in fluid communication with the primary lubricant return line, and the method further comprising opening the one or more drain valves to drain the lubricant from the one or more rotating components through the primary lubricant return line.

The method of any preceding clause, further comprising closing the one or more drain valves to cause the lubricant to drain into the auxiliary reservoir.

The method of any preceding clause, the turbine engine further comprising a fan shaft coupled to the fan, the output shaft being the fan shaft.

The method of any preceding clause, the turbine engine further comprising a low-pressure shaft coupled to the turbo-engine, the input shaft being the low-pressure shaft.

The method of any preceding clause, the gear assembly comprising a plurality of gears.

The method of any preceding clause, the lubricant dispersion device being drivingly coupled to at least one of the plurality of gears.

The method of any preceding clause, the gear assembly further comprising a planet carrier, the lubricant dispersion device being drivingly coupled to the planet carrier.

The method of any preceding clause, the gear assembly further comprising a pin disposed through at least one of the plurality of gears, the lubricant dispersion device being drivingly coupled to the pin.

The method of any preceding clause, the lubricant dispersion device being an annular disk that is annular about the longitudinal centerline axis.

The method of any preceding clause, the lubricant dispersion device including a hub and a plurality of arms coupled to the hub.

The method of any preceding clause, each of the plurality of arms including a scoop portion, and the method further comprising scooping the lubricant in the auxiliary reservoir with the scoop portion, and dispersing the lubricant to the one or more rotating components with the scoop portion.

The method of any preceding clause, the scoop portion of each of the plurality of arms having a generally crescent shape.

The method of any preceding clause, further comprising rotating the lubricant dispersion device in a first rotational direction of the fan, and rotating the lubricant dispersion device in a second rotational direction of the fan, the second rotational direction being opposite the first rotational direction.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A lubrication system for a turbine engine having a longitudinal centerline axis and one or more rotating components, the lubrication system comprising:
   a primary lubrication system that supplies lubricant to the one or more rotating components during normal operation of the turbine engine; and
   an auxiliary lubrication system comprising:
      an auxiliary reservoir that stores the lubricant therein; and
      a lubricant dispersion device that rotates about the longitudinal centerline axis, the lubricant dispersion device collecting the lubricant in the auxiliary reservoir and dispersing the lubricant to the one or more rotating components as the lubricant dispersion device rotates.

2. The lubrication system of claim 1, wherein the primary lubrication system comprises a primary pump and a primary lubricant supply line, the primary pump pumping the lubricant to the one or more rotating components through the primary lubricant supply line.

3. The lubrication system of claim 1, further comprising one or more drain valves in fluid communication with the primary lubrication system, the one or more drain valves closing to cause the lubricant to drain into the auxiliary reservoir.

4. The lubrication system of claim 1, wherein the turbine engine comprises a fan, and the lubricant dispersion device rotates in a first rotational direction of the fan, and in a second rotational direction of the fan, the second rotational direction being opposite the first rotational direction.

5. The lubrication system of claim 1, wherein the turbine engine comprises a gear assembly comprising an input shaft and an output shaft that is drivingly coupled to the input shaft through the gear assembly, and the lubricant dispersion device is drivingly coupled to at least one of the output shaft, the input shaft, or the gear assembly.

6. The lubrication system of claim 5, wherein the auxiliary lubrication system comprises a lubricant dispersion device gear assembly, the lubricant dispersion device being drivingly coupled to the at least one of the output shaft, the input shaft, or the gear assembly through the lubricant dispersion device gear assembly.

7. The lubrication system of claim 6, wherein the lubricant dispersion device gear assembly has a gear ratio such that a rotational speed of the lubricant dispersion device is greater than a rotational speed of the at least one of the output shaft, the input shaft, or the gear assembly.

8. The lubrication system of claim 1, wherein the auxiliary lubrication system comprises a clutch that engages the lubricant dispersion device such that the lubricant dispersion device rotates or that disengages the lubricant dispersion device to prevent the lubricant dispersion device from rotating.

9. The lubrication system of claim 8, wherein the clutch engages the lubricant dispersion device when the primary lubrication system is unable to supply the lubricant to the one or more rotating components.

10. The lubrication system of claim 9, wherein the clutch disengages the lubricant dispersion device when the primary lubrication system is supplying the lubricant to the one or more rotating components.

11. A turbine engine having a longitudinal centerline axis, the turbine engine comprising:
   a turbo-engine including a shaft;
   a fan drivingly coupled to the shaft of the turbo-engine, wherein rotation of the shaft causes the fan to rotate;
   one or more rotating components in at least one of the turbo-engine or the fan; and
   a lubrication system for lubricating the one or more rotating components, the lubrication system comprising:
      a primary lubrication system that supplies lubricant to the one or more rotating components during normal operation of the turbine engine; and
      an auxiliary lubrication system comprising:
         an auxiliary reservoir that stores the lubricant therein; and
         a lubricant dispersion device that rotates about the longitudinal centerline axis, the lubricant dispersion device collecting the lubricant in the auxiliary reservoir and dispersing the lubricant to the one or more rotating components as the lubricant dispersion device rotates.

12. The turbine engine of claim 11, wherein the primary lubrication system comprises a primary pump and a primary lubricant supply line, the primary pump pumping the lubricant to the one or more rotating components through the primary lubricant supply line.

13. The turbine engine of claim 11, further comprising one or more drain valves in fluid communication with the primary lubrication system, the one or more drain valves closing to cause the lubricant to drain into the auxiliary reservoir.

14. The turbine engine of claim 11, wherein the lubricant dispersion device rotates in a first rotational direction of the fan, and in a second rotational direction of the fan, the second rotational direction being opposite the first rotational direction.

15. The turbine engine of claim 11, wherein the turbine engine comprises an input shaft coupled to the turbo-engine, an output shaft coupled to the fan, and a gear assembly, the output shaft being drivingly coupled to the input shaft through the gear assembly, and the lubricant dispersion device being drivingly coupled to at least one of the output shaft, the input shaft, or the gear assembly.

16. The turbine engine of claim 15, wherein the auxiliary lubrication system comprises a lubricant dispersion device gear assembly, the lubricant dispersion device being drivingly coupled to the at least one of the output shaft, the input shaft, or the gear assembly through the lubricant dispersion device gear assembly.

17. The turbine engine of claim 16, wherein the lubricant dispersion device gear assembly has a gear ratio such that a rotational speed of the lubricant dispersion device is greater than a rotational speed of the at least one of the output shaft, the input shaft, or the gear assembly.

18. The turbine engine of claim 11, wherein the auxiliary lubrication system comprises a clutch that engages the lubricant dispersion device such that the lubricant dispersion device rotates or that disengages the lubricant dispersion device to prevent the lubricant dispersion device from rotating.

19. The turbine engine of claim 18, wherein the clutch engages the lubricant dispersion device when the primary lubrication system is unable to supply the lubricant to the one or more rotating components.

20. The turbine engine of claim 19, wherein the clutch disengages the lubricant dispersion device when the primary lubrication system is supplying the lubricant to the one or more rotating components.

\* \* \* \* \*